(12) United States Patent
Pechanek

(10) Patent No.: US 7,509,483 B2
(45) Date of Patent: Mar. 24, 2009

(54) METHODS AND APPARATUS FOR META-ARCHITECTURE DEFINED PROGRAMMABLE INSTRUCTION FETCH FUNCTIONS SUPPORTING ASSEMBLED VARIABLE LENGTH INSTRUCTION PROCESSORS

(75) Inventor: Gerald George Pechanek, Cary, NC (US)

(73) Assignee: Renesky Tap III, Limited Liability Company, Wilmington, DE (US)

( * ) Notice: Subject to any disclaimer, the term of this patent is extended or adjusted under 35 U.S.C. 154(b) by 204 days.

(21) Appl. No.: 11/677,640

(22) Filed: Feb. 22, 2007

(65) Prior Publication Data

US 2007/0180440 A1 Aug. 2, 2007

Related U.S. Application Data

(63) Continuation of application No. 10/648,154, filed on Aug. 26, 2003, now Pat. No. 7,185,177.

(60) Provisional application No. 60/427,546, filed on Nov. 19, 2002, provisional application No. 60/419,529, filed on Oct. 21, 2002, provisional application No. 60/405,726, filed on Aug. 26, 2002.

(51) Int. Cl.
*G06F 9/40* (2006.01)
(52) U.S. Cl. .................. 712/215; 712/214; 712/206
(58) Field of Classification Search ................ 712/206, 712/210, 214, 215
See application file for complete search history.

(56) References Cited

U.S. PATENT DOCUMENTS 3,833,889 A 9/1974 Cray
5,197,145 A 3/1993 Kitamura et al.
5,430,851 A 7/1995 Hirata et al.

(Continued)

OTHER PUBLICATIONS

Blauuw, et al., "Computer Architecture: Concepts and Evolution", *Publisher: Addison-Wesley*, (1997),71-75; 589-590; 648-664.

(Continued)

*Primary Examiner*—Aimee J Li

(57) ABSTRACT

A computing architecture and software techniques are described which modifies the basic sequential instruction fetching mechanism of a processor by separating a program's control flow from its functional execution flow. A compiled sequential HLL program's static control structures are analyzed and a separate program based on its own unique instructions is created that primarily generates addresses for the selection of functional execution instructions. The original program is now represented by an instruction fetch program and a set of function/logic execution instructions. This basic split allows multiple instruction addresses to be generated in parallel to access multiple instruction memories. These multiple instruction memories contain only the function/logic instructions of the program and no control structure operations such as branches or calls. All the original program's control instructions are split from the original program and used to create the instruction addressing program. This approach allows a variable number of instructions to be issued in parallel whenever the program can allow for it. The instructions of this approach are referred to herein as assembled variable length instructions or AVLIs. Alternative techniques are provided that deal with conditional and unconditional branches. In addition, all or a majority of duplicate function/logic instructions can be removed relying on a single copy or a small number of copies to be stored and referenced as needed by the control program based on architecture features so that overall instruction storage can be reduced.

20 Claims, 23 Drawing Sheets

U.S. PATENT DOCUMENTS

| | | | |
|---|---|---|---|
| 5,483,657 A * | 1/1996 | Hatakeyama | 712/27 |
| 6,065,112 A | 5/2000 | Kishida et al. | |
| 6,557,096 B1 | 4/2003 | Ganapathy et al. | |
| 6,609,191 B1 | 8/2003 | Hooker | |
| 6,895,482 B1 | 5/2005 | Blackmon et al. | |

OTHER PUBLICATIONS

Johnson, "An introduction to Vector Processing, Computer Design", (Feb. 1978),89-97.

Pechanek, et al., "The ManArray Embedded Processsot Architecture", *Proceedings of the 26th Euromicro Conference*, Published IEEE Computer Society,(2000),348-355.

Peleg, et al., "Intel MMX for Multimedia PC's", *Communications of the ACM*, (Jan. 1997),25-38.

* cited by examiner

| Clock | WIM Addr | Decode WIM instr. | GenF Addr | IM0 Addr | IM0 Instr | D1/ Fadr | D2/ Fopr | Ex/ Wra | Wrr/ Scnd | IM1 Addr | IM1 Instr | D1/ Fadr | D2/ Fopr | Ex/ Wra | Wrr/ Scnd |
|---|---|---|---|---|---|---|---|---|---|---|---|---|---|---|---|
| j | 16 | | | | | | | | | | | | | | |
| j+1 | 17 | 0Sf 26,n,n; | | | | | | | | | | | | | |
| j+2 | 17 | 1Mf 26,11,n; Alp1023,17; | 26,n,n | | | | | | | | | | | | |
| j+3 | 17 | 1Mf 26,11,n; | 26,11,n | 26 | Add | | | | | | | | | | |
| j+4 | 17 | 1Mf 26,11,n; | 26,11,n | 26 | Add | Add | | | | | | | | | |
| j+5 | 17 | 1Mf 26,11,n; | 26,11,n | 26 | Add | Add | Add | | | | | | | | |
| j+6 | 17 | 1Mf 26,11,n; | 26,11,n | 26 | Add | Add | Add | Add | | 11 | Mpy | | | | |
| j+7 | 17 | 1Mf 26,11,n; | 26,11,n | 26 | Add | Add | Add | Add | Add | 11 | Mpy | Mpy | | | |
| j+8 | 17 | 1Mf 26,11,n; | 26,11,n | 26 | Add | Add | Add | Add | Add | 11 | Mpy | Mpy | Mpy | | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| j+1024 | 19 | 0Sf n,11,n | 26,11,n | 26 | Add | Add | Add | Add | Add | 11 | Mpy | Mpy | Mpy | Mpy | Mpy |
| j+1025 | 20 | Nxi a1,a2,a3 | n,11,n | 26 | Add | Add | Add | Add | Add | 11 | Mpy | Mpy | Mpy | Mpy | Mpy |
| j+1026 | 21 | | a1,a2,a3 | | Add | Add | Add | Add | Add | 11 | Mpy | Mpy | Mpy | Mpy | Mpy |
| j+1027 | 22 | | | a1 | Nxti' | | Add | Add | Add | a2 | Nxti' | Mpy | Mpy | Mpy | Mpy |

Fig. 12

- IM#Addr & IM#Instr = Fetch IM# instruction at IM# address
- D1/Fadr = Decode 1 & Fetch address registers
- D2/Fopr = Decode 2, Fetch operands & generate next operand addresses
- Ex/Wra = Execute & Write back operand addresses
- Wrr/Scnd = Write back results & Set condition registers
- Assumes operand bypassing is used

Fig. 14B

METHODS AND APPARATUS FOR META-ARCHITECTURE DEFINED PROGRAMMABLE INSTRUCTION FETCH FUNCTIONS SUPPORTING ASSEMBLED VARIABLE LENGTH INSTRUCTION PROCESSORS

RELATED U.S. APPLICATION DATA

The present application is a continuation of Ser. No. 10/648,154, filed Aug. 26, 2003 now U.S. Pat. No. 7,185,177 and claims the benefit of U.S. Provisional Application No. 60/405,726, filed Aug. 26, 2002; U.S. Provisional Application No. 60/419,529, filed Oct. 21, 2002; and U.S. Provisional Application No. 60/427,546, filed Nov. 19, 2002, all of which are incorporated by reference herein in their entirety.

FIELD OF INVENTION

The present invention relates generally to improved methods and apparatus for fetching instructions in processing systems. More particularly, such techniques are addressed for purposes of achieving improved performance with increased instruction parallelism through assembled variable length instructions (AVLIs), to provide support for combined vector AVLI operations, and to provide alternative techniques that deal with conditional and unconditional branches, and provide efficient auto-looping facilities. The unique AVLIs may be advantageously utilized to provide variable length multiple instruction parallelism at almost any instruction step in a program and through a unique AVLI architecture also provides compression features that can reduce the size of storage for the function instructions of a program. More specifically, the present invention splits a program's control structure from its functional structure and treats each one separately allowing for their optimization, synergistic interaction, and wide ranging improvements in processor design.

BACKGROUND OF THE INVENTION

Processor designs and programs to run on processors can trace their evolution from basic mathematical principles set out by the British mathematician A. M. Turing in the 1930s, whose "Turing Machine" represents a mathematical model of a sequential computational process. Sequential control concepts may be attributed to even earlier machines of Babbage in the 1800s. The idea of a sequential process was embodied in the von Neumann processor architecture developed in the 1940s, which had a number of important characteristics that have been maintained in most commercial processors today. The salient characteristics of these processors to note herein are that the program and data are stored in sequentially addressed memory and use a single sequential instruction stream made up of single-address single-operation instructions sequenced by an instruction counter. See, for example, "Computer Architecture Concepts and Evolution" by G. A. Blaauw and F. P. Brooks, Jr., Addison-Wesley, 1997, p. 589, (subsequently referenced herein as Blaauw and Brooks). Even though over the years there have been many types of processors and software languages developed for the creation of programs to accomplish various functions, most commercial machines are still based on Turing and von Neumann principles. The overriding architectural philosophy of most commercial processors embeds a control structure based on sequential principles with the program's arithmetic/logical function. Because of this inherent embedding from the beginning of processor developments, it can be understood why the sequential instruction fetch mechanism of providing a sequence of instruction addresses by an instruction counter has remained basically the same throughout the history of processors. There have been a few exceptions with one being the IBM 650 processor, Blaauw and Brooks pp. 648-664, announced in 1953 where a fetched instruction contained a next instruction address field. But, this mechanism still embedded a program's control structure with its arithmetic logic function because the next instruction address field was included as part of the 650 instruction format of its instruction set comprising load, store, arithmetic, shift, input/output (I/O), and branch instructions. Further, it was discounted as being inefficient for future architectures and has not been pursued in any new processor design.

Another related idea is that of microprogrammed processors which used microinstructions to implement, via a mircoprogram stored in an internal microstore, "higher-level" more complex instructions. The microinstructions were many times hidden from the programmer who only used the higher level more complex instruction set of the processor. Microinstructions are primitive level instructions containing "implementation-derived" control signal bits that directly control primitive operations of the processor and usually differed in each processor implementation, Blaauw and Brooks pp. 71-75. This microprogramming mechanism still embeds the microprogram's control structure with, in this case, primitive operations because any microinstruction that contained a microstore next instruction address field also included control signal bits that directly control primitive operations of the processor. Some of the disadvantages of microprogramming are associated with the cost and performance impact of the microstore and microprogram control unit, lack of uniformity between implementations, additional programming and documentation costs.

In order to obtain higher levels of instruction parallelism in a processor architecture based on von Neumann principles, packed data, see, for example, "Intel MMX for Multimedia PCs", by A. Peleg, S. Wilkie, and U. Weiser, Communications of the ACM, January 1997, Vol. 40, No. 1; vector, see, for example, "An Introduction to Vector Processing", by P. M. Johnson of Cray Research, Inc., Computer Design, February 1978, pp. 89-97; and very long instruction word (VLIW) architectures, see, for example, "The ManArray Embedded Processor Architecture", by G. G. Pechanek and S. Vassiliadis, Proceedings of the 26th Euromicro Conference: "Informatics: inventing the future", Maastricht, The Netherlands, Sep. 5-7, 2000, Vol. I, pp. 348-355 and more specifically U.S. Pat. Nos. 6,151,668, 6,216,223, 6,446,190, and 6,446,191, have been developed.

In the packed data mechanism, an instruction specifies multiple operations on data units containing multiple data elements, such as a 64-bit data unit consisting of eight 8-bit data elements. This packed data construct is used in arithmetic/logical instructions that are embedded with a program's control structure and does not affect the sequential instruction fetch rules of the basic architecture. In vector machines, a vector instruction specifies an operation on a block of data and provides hardware resources to support the repetitive operations on the block of data. Vector instructions are still fetched in a sequential manner and vector machines still use the standard control structures embedded in the instruction stream. In the traditional VLIW case, a single addressable long instruction unit is made up of multiple single instructions words where the packing of the instructions in the VLIW is based upon independence of operation. In the indirect VLIW case, as described in the above listed patents, a single addressable standard width instruction from a primary instruction stream causes the indirect fetch of a VLIW from one or multiple local caches of VLIWs. In both of these VLIW architectures, a program's control structure is still embedded with the program's arithmetic/logical function and the architectures adhere to the sequential instruction fetch rules of a classic sequential machine.

There are difficulties for improving processor performance beyond what these architectures allow that ultimately stem from the basic embedding of a program's control structure with its arithmetic logic function coupled with the sequential instruction counter fetching rules under which the processor architectures are based. To get at the basic issues involved, one of these difficulties can be stated as, how can multiple instructions be issued per cycle given the way programs are written as sequential steps including both functional steps and control, call/return and branching, steps? The primary commercial attempts to solve this problem have resulted in superscalar and VLIW architectures. Both architectures use a mechanism to analyze a sequential program for opportunities to issue multiple instructions in parallel. In the superscalar case, the analysis mechanism is embedded in hardware requiring significant memory and complex logic to support look-ahead and multiple issue rules evaluation. For three issue and larger machines, the memory and logic overhead becomes increasingly large and complex leading to extended and expensive development and testing time. In the VLIW case, the multiple issue analysis mechanism is embedded in a compiler in order to minimize hardware complexity while still supporting large issue rates. This technique has great value but the analysis results are applied to VLIW hardware that still is based on a sequential program counter instruction fetch approach where control instructions are embedded with functional instructions in the program instruction stream. One of the consequences of this embedding tied with a sequential program counter addressing fetch rule has been the use of fixed-size VLIW memories in both the traditional VLIW and the indirect VLIW approaches mentioned earlier. This has led to inefficiencies in using VLIW architectures generally and lost flexibility due to either increased use of NOPs for cases when all the instruction slots of a VLIW cannot be used or in overhead latency to load VLIWs when those VLIWs may be of single or short use duration.

Another difficulty to be faced in improving processor performance concerns whether vector operations can be efficiently supported in a processor design? Vector operations have typically been treated as data processing operations of an application specific nature. Operations on vectors are generally defined as multi-cycle operations requiring significant embedded hardware vector registers and control logic. Traditionally, vector functionality has been treated as excessive and only special purpose machines have been built to support vector operations.

Another difficulty lies in the code density of superscalar, VLIW, and vector machines and concerns whether the code density can be improved by compressing the instruction stream? Instruction compression is presently treated as an add-on mechanism to improve code density of an existing processor architecture. Consequently, instruction compression mechanisms must deal with mixed function and control instructions within the program and many times need to use inventive mechanisms to deal with these embedded control instructions such as branches and calls/returns.

Therefore, there is needed a mechanism that can issue a variable number of instructions depending upon the available parallelism throughout a program without the large overhead of embedded look ahead and complex rules evaluation logic or fixed size VLIW memories. There is a further need for a mechanism that supports vector operations in a flexible fashion that is easily implemented. There is also a need for a mechanism that inherently supports techniques that can compress a program instruction stream.

SUMMARY OF THE INVENTION

The present invention addresses a number of difficulties with classical processor architectures and provides unique and improved methods and apparatus for fetching instructions in processing systems in general for improved performance with alternative techniques that deal with conditional and unconditional branches, efficient auto-looping, facilities, increased instruction parallelism through assembled variable length instructions (AVLIs), and support for combined vector AVLI operations. The unique AVLIs allow variable length multiple instruction parallelism as needed by a program and through the unique AVLI architecture provides compression features that can reduce the size of program storage. More specifically, the present invention splits a program's control structure from its functional structure and treats each one separately allowing for their optimization, synergistic interaction, and said improvements in processor design.

These novel and important aspects of this invention result from modifying the basic sequential instruction fetching mechanism by separating a program's control flow from its functional execution flow. Initially, a program is written in a higher-level language (HLL) and maintains the standard sequential programming control structures based on the historical sequential computational process. Consequently, the present invention does not require existing programming languages to change. The underlying implementation of the processor is what changes and differs from previous processor designs to support the program language. The basic change to the underlying processor hardware and software generation process begins with an analysis of a compiled HLL program's static control structures which are subsequently removed from the program's function stream, and a separate program based on its own unique instructions is created that primarily generates addresses for the selection of functional execution instructions stored in their own separate memories. The original program is now represented by an instruction fetch program and a set of function/logic execution instructions. This basic split allows a variable number of instruction addresses to be generated in parallel cycle-by-cycle, as needed to access multiple function-instruction memories. These multiple function-instruction memories contain only the function/logic instructions of the programs and no control structure operations such as branches or calls. All the original program's control instructions are split from the original program and used to create the function/instruction addressing program. This novel design provides a more optimized mechanism whereby a variable number of instructions can be issued in parallel whenever the program can allow for it. The instructions for this approach are referred to as Assembled Variable Length Instructions or AVLIs. This approach also provides alternative ways of dealing with conditional and unconditional branches as described in greater detail below. Further, all or a majority of duplicate function/logic instructions can be removed relying on a single copy or a small number of copies to be stored and referenced as needed by the instruction fetch program thereby compressing overall instruction storage.

These and other features, aspects, techniques and advantages of the invention will be apparent to those skilled in the art from the following detailed description, taken together with the accompanying drawings.

BRIEF DESCRIPTION OF THE DRAWINGS

FIG. 12 illustrates an expanded parallel multiple pipeline timing chart for the auto-loop example of FIG. 10A;

FIG. 14B illustrates a set of exemplary 32-bit PE instructions;

DETAILED DESCRIPTION

In most prior art processors, an instruction counter, also known as a program counter (PCntr), is used to generate the addresses of program instructions typically stored in sequentially addressable locations in an instruction memory. The PCntr advances to select the next sequential instruction typically on every processor clock cycle. The instructions fetched contain arithmetic/logical instructions as well as instructions that can cause the PCntr to change to a new address value according to a control structure that is embedded in the program. Different forms of branches, calls, returns, and auto-loop constructs are all forms of control instructions along with interrupts, due to external events, that can cause the PCntr to change to a new instruction address.

Figure 1:
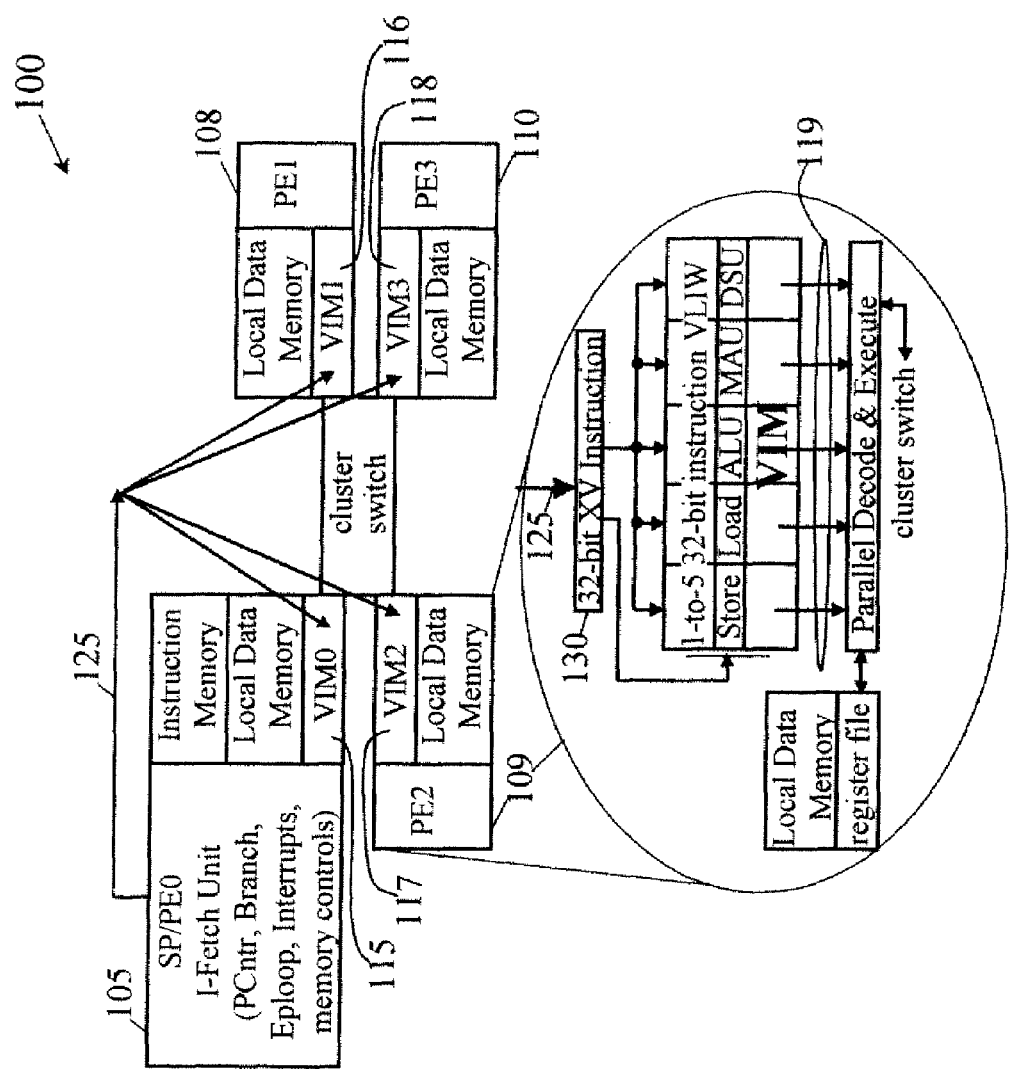
FIG. 1 illustrates a prior art signal processor, the BOPS, Inc. Manta 2×2 iVLIW array processor based on the ManArray architecture.

To highlight an example of such operation, a prior art indirect VLIW processor architecture, FIG. 1, is briefly described. The BOPS, Inc. Manta processor 100 as illustrated in FIG. 1 comprises an array controller Sequence Processor (SP) merged with processor-element-0 PE0 105 and three additional PEs 108-110 each containing a small VLIW cache memory (VIM) 115-118. PE2 109 is zoomed in on to highlight the internal indirect VLIW data flow. Each VIM is a wide fixed width memory that stores 5 instruction 160-bit wide VLIWs accessed through a VLIW bus 119 that remains local to each PE and is of low capacitance due to short line lengths. A global 32-bit instruction bus 125 connects to each PE and a broadcast indirect execute VLIW (XV) instruction is received in each PE in an internal register such as register 130 shown in PE2 and causes the appropriate VLIW to be fetched from the distributed local VIMs and executed. Using immediate enable bits in the XV all or any subset of instructions contained in the same VLIW VIM line can be executed simultaneously as a VLIW, using only the 32-bit XV as a trigger. The iVLIW approach minimizes NOPs and replication of instructions thus improving code density and optimizing the program memory bandwidth for a 32-bit instruction flow. This technique is applicable to uniprocessors and array processors with multiple distributed VIMs as is the case, for example, for the 4 PE processor shown in FIG. 1. The controller SP 105 contains an I-Fetch unit which comprises a program counter PCntr, branch, eventpoint loop, interrupt and memory control logic. The Manta processor uses a traditional PCntr and sequential instruction addressing mechanism with the control structures embedded in the Manta program and uses the indirect VLIW facility to access the arithmetic/logic/load/store functions stored in the VIMs.

Figure 2:
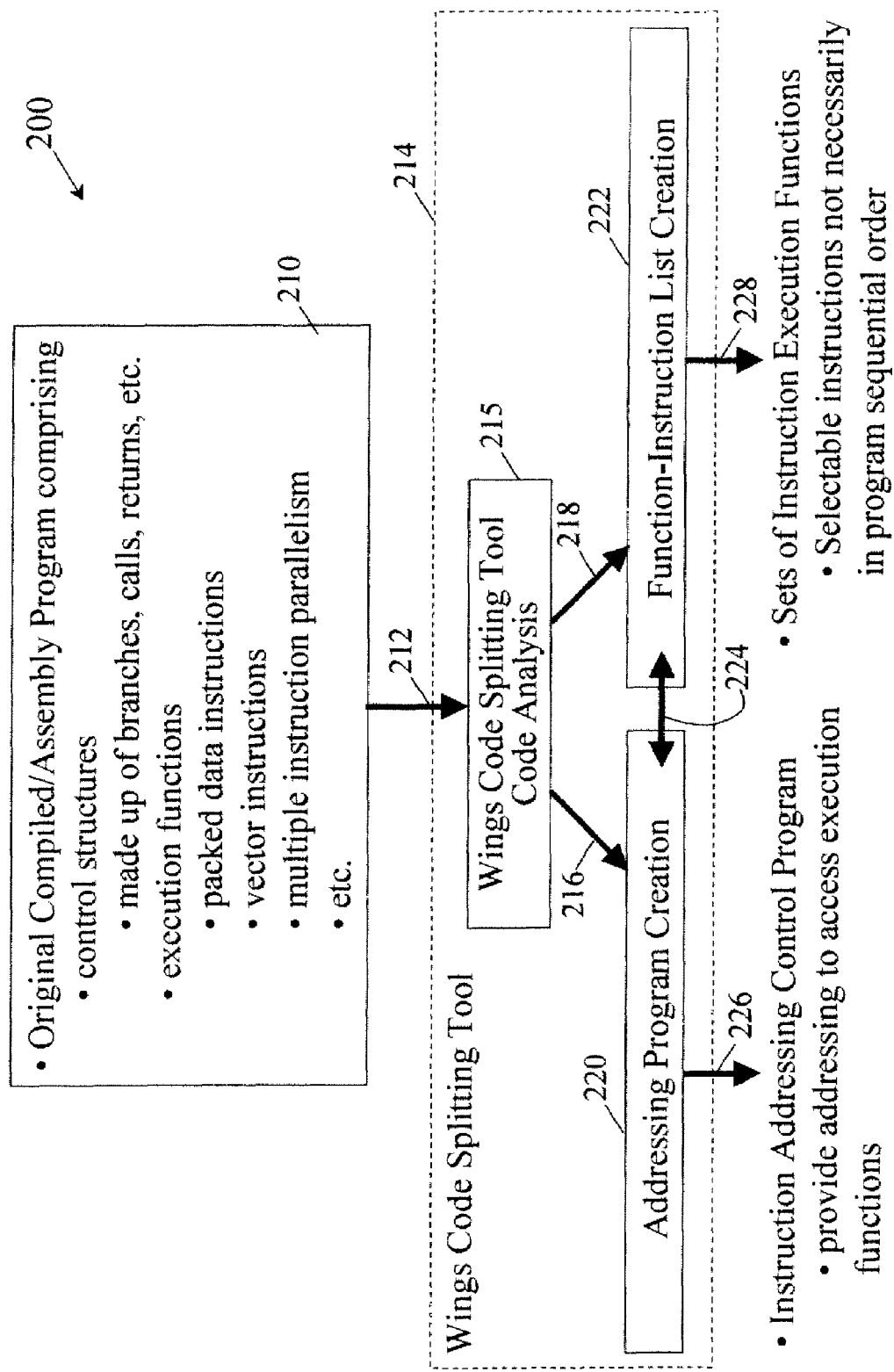
FIG. 2 illustrates a Wings sequential programming model flow showing use of the Wings code splitting tool.

By contrast, in the Wings programming model of the present invention, a program's control structures are split from its functional structures and each set of structures are treated separately allowing for their optimization and providing new capabilities for the Wings processor as addressed further below. FIG. 2 shows an exemplary Wings programming system 200 consisting of a program 210 prepared in a standard manner with an assembler or high level programming languages and compiled to an intermediate assembly form as input 212 to a Wings code splitting tool 214. The programmer or compiler also identifies all cases where two or more instruction, up to the maximum supported by the target processor, can be executed in parallel. The Wings code splitting tool does a static analysis of the code provided in analyzer 215 to determine a number of characteristics of the program 210 including, but not limited to the following: all branch and call/return control structures; all auto-looping cases; location of all interrupt routines; a listing of all non-control instruction references; all parallel instruction issue cases; all vector processing opportunities; and all conditional execution opportunities.

This information and the static control structures as embedded with branch, call/return, auto-loop instructions in the original program 210 are provided on output 216 to functional unit 220 which creates an instruction addressing control program 226 to be executed separately on the Wings processor. The Wings code splitting tool code analyzer 215 also determines all non-control instructions, including the indirect VLIW instructions if used, and outputs these instructions to functional 222 which removes all duplicate instructions, removes all XV's if used, assembles all parallel instruction cases into AVLI form, and creates multiple function-instruction lists 228 plus interfaces 224 with functional unit 220 to insure proper instruction reference addressing.

Figure 3:
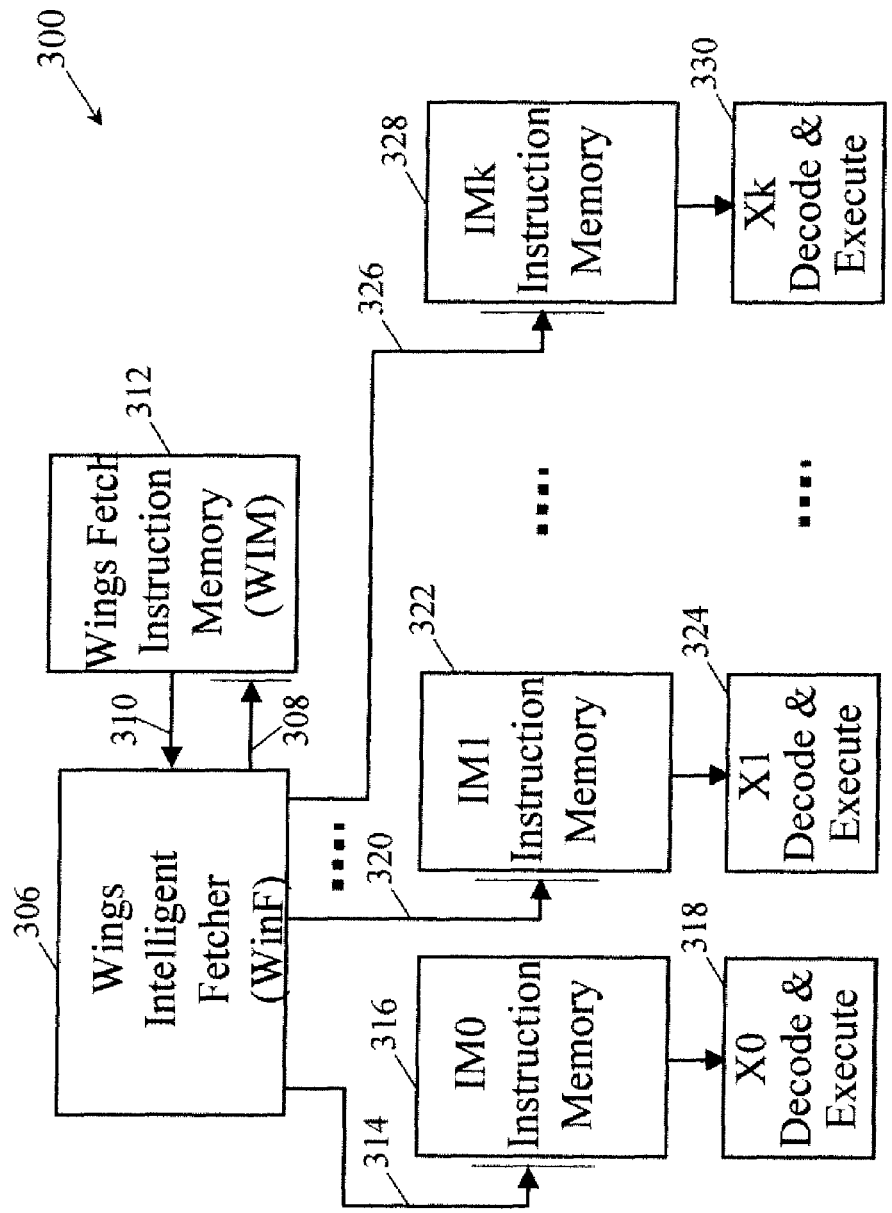
FIG. 3 illustrates a Wings processor basic machine organization for the purpose of illustrating the logical instruction flow.

FIG. 3 illustrates a high level view 300 of a Wings processor basic machine organization for the purpose of illustrating the logical instruction flow. The Wings processor is made up of a Wings intelligent fetcher 306 which provides addresses 308 to and receives instruction fetch (IF) instructions 310 from Wings instruction memory (WIM) 312 and executes the IF instructions generating up to "k" instruction memory (IMemory) addresses, 314, 320, 326. Each IMemory address is connected to a separate instruction memory labeled IM0 316, IM1 322, . . . IMk 328. Read and write control lines are not shown for purposes of clarity and will depend upon the type of memory used. Each instruction memory is connected to its own decode and execute unit 318, 324, . . . 330, respectively, allowing multiple instructions to be executed in parallel as an AVLI that is created by the multiple address selections from the Wings intelligent fetcher 306. The Wings processor organization of FIG. 3 is termed a meta-architecture organization from which multiple diverse instruction set architectures can be developed for specific applications. It is noted that multiple memories may be combined into a single memory which has multiple independent access ports to provide equivalent function to separate memories, if so doing is an effective implementation mechanism.

Figure 4:
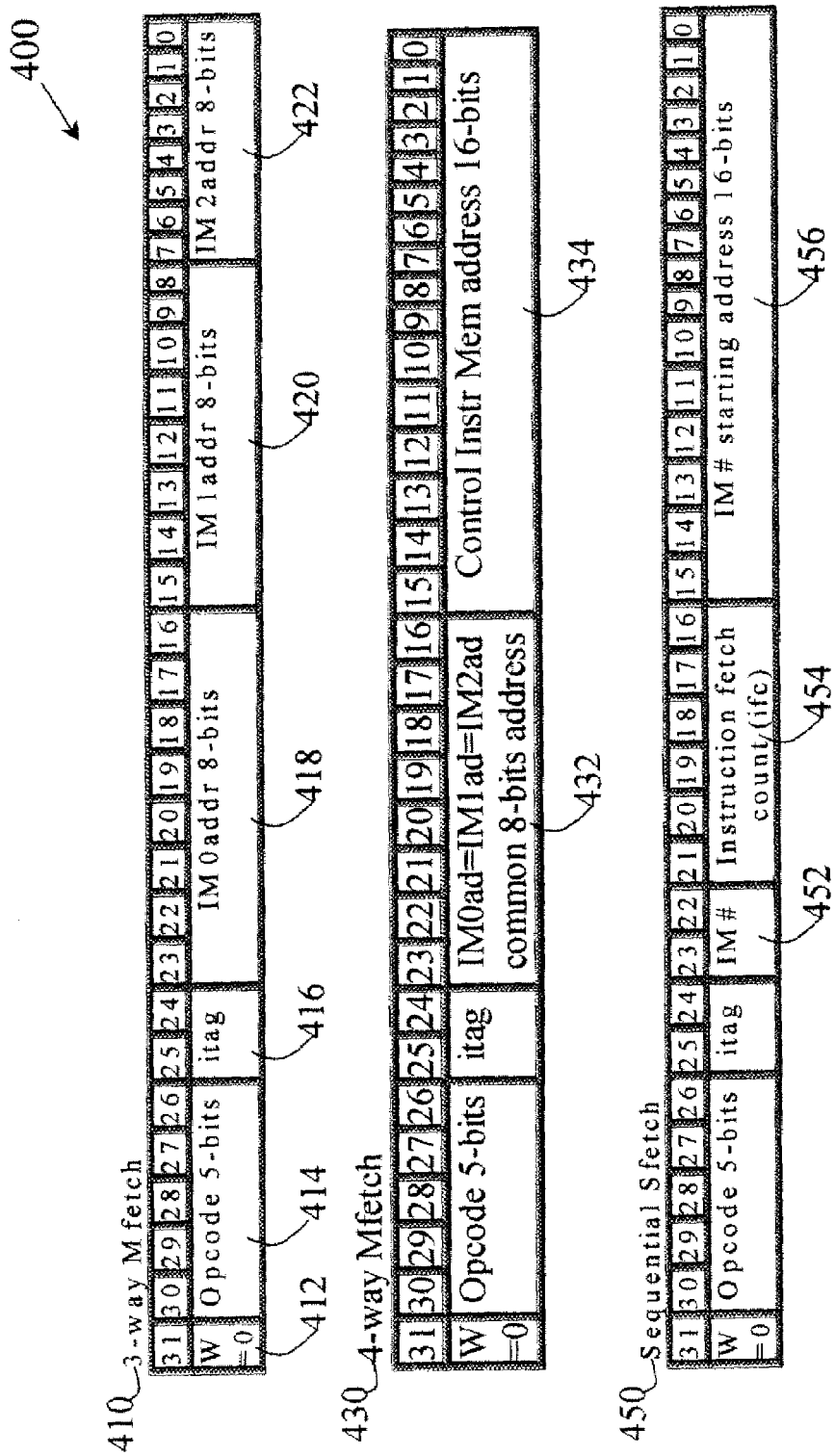
FIG. 4 illustrates examples of Wings intelligent Fetcher (WinF) 32-bit instruction fetch (IF) instruction formats.
Figure 5:
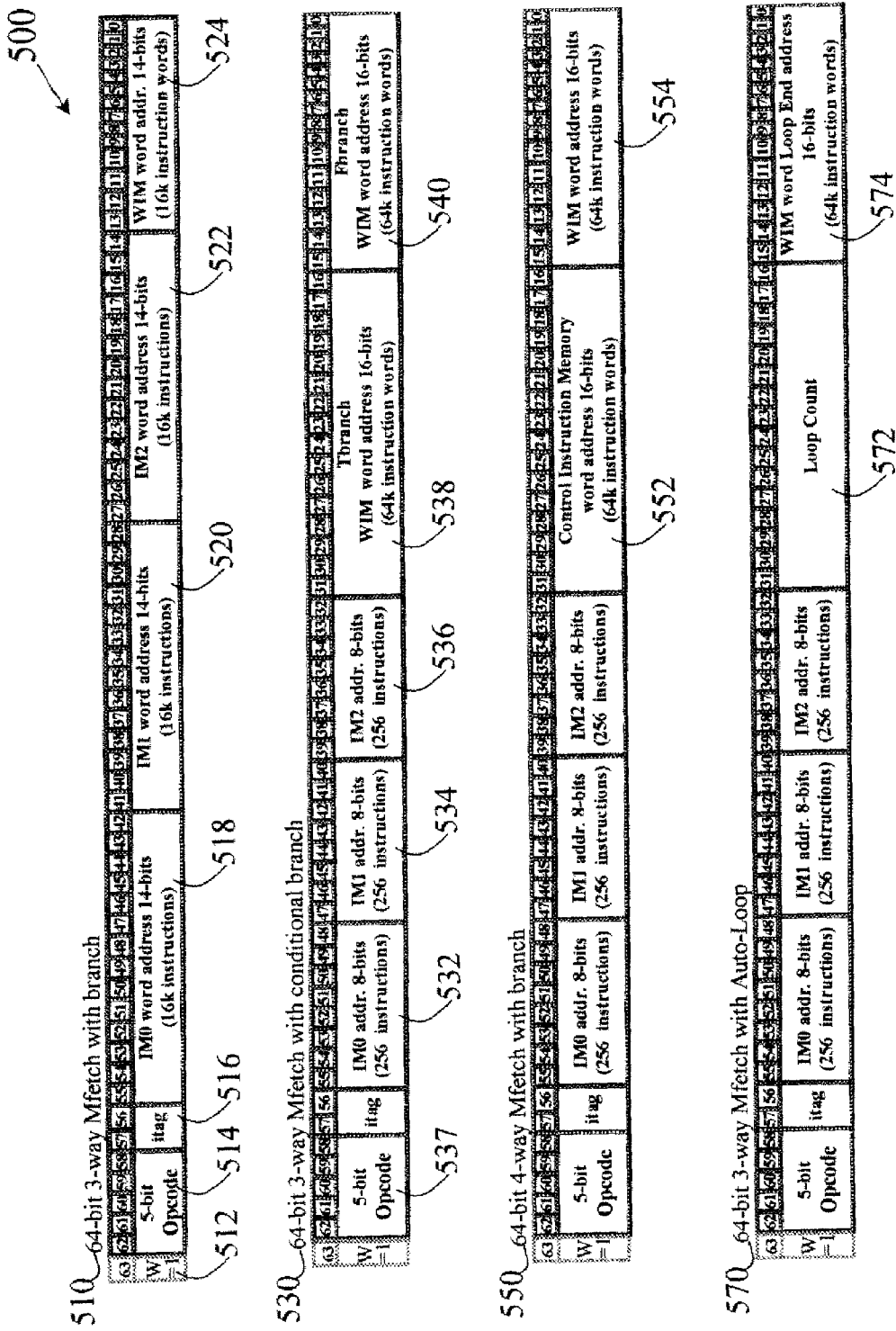
FIG. 5 illustrates a first set of examples of WinF 64-bit IF instruction formats.

To explain the operation of the Wings intelligent fetcher (WinF) some examples of instruction types are presented in FIGS. 4-6. Though other options are certainly available for implementation of this novel meta-architecture a presently preferred method uses a dual WinF instruction format of 32-bits and 64-bits. In one exemplary approach, the WinF instructions are stored in the Wings instruction memory (WIM) on 32-bit word boundaries. These WinF instructions are of the following basic forms, where || indicates a basic structure concatenation of instruction format fields and a primarily direct addressing architecture is assumed:

32-bit instruction: Opcode||IMemory address/s; sequential WIM addressing assumed, 64-bit instruction: Opcode||IMemory address/s||WIM address; used for non-sequential WIM addressing It will be appreciated that with appropriate coding mechanisms, such as use of unique opcodes, sequential WIM addressing forms of the 64-bit instructions can be specified in which case the instructions would not require a WIM address to be concatenated onto the format thereby providing additional bits for coding new instruction types. It is also appreciated that a single 64-bit format, or other single format length, could be used for all WIM instructions. Two basic examples of the sequential WIM addressing form are:

Sfetch ifc, IM#, IM#Address; fetch next (ifc) instructions sequentially from IMemory# (IM#) beginning at IM#Address, and Mfetch IM0address, IM1address, . . . IMkaddress; Assembled Variable Length Instruction (AVLI) fetch up to k instructions from up to k IMemories at specified IMemory addresses, respectively.

It will be appreciated that a simplified processor system could be defined which did not make use of multiple instruction fetching and only uses a single IMemory. This simple system would require only the Sfetch instruction format type for support of function-instruction fetch using reduced or expanded forms of direct, indirect, and other WIM addressing types, as well as, support for auto-looping, unconditional, and conditional forms of branching. It will also be recognized that alternate forms of the Mfetch instruction type are possible. For example, an Mfetch instruction can be designed where the IM addresses are generated by an indirect method or implied by some specific rule as defined in the architecture.

FIG. 4 shows three 32-bit WinF instruction formats 400 for a processor organization with three IMemories, IM0, IM1, and IM2. Specifically FIG. 4 shows two examples of Mfetch instruction formats 410 and 430 and one example of an Sfetch instruction format 450. Common to the three instruction formats 410, 430, and 450 are three major fields: an instruction width field W 412 is set to a 0 for 32-bit instructions and set to a 1 for 64-bit instructions, the instruction's operation code is specified in 5-bit Opcode field 414, and a tag associated with the selected AVLI is specified in an itag field 416. It is noted that the itag is not a required field in the WinF instruction format but can be directly and more flexibly associated with the IMemories. The 3-way Mfetch instruction format 410 has additional format fields IM0 418, IM1 420, and IM2 422, which in the illustrated example are address fields for direct addresses, in this example, for instructions in the IM0, IM1, and IM2 respectively. A 2-way Mfetch is treated as a subset of the 3-way MFetch by use of different opcodes to cover the instruction selection combinations of IM0 with IM1, IM0 with IM2, and IM1 with IM2.

Another form of Mfetch illustrated by the 4-way Mfetch format 430 is useful where the multiple instructions to be executed in parallel can be located at the same physical IMemory address requiring only one address field 432 to address multiple IMemories, which in this case are IM0, IM1, and IM2. Address field 434 provides a fourth instruction memory address for execution in parallel with the other three IMemory instructions. By way of example, this fourth memory may be used for some control-I/O function. Sequential Sfetch instruction format 450 is for an instruction used when only a block of instructions from a single IMem# is to be fetched. To accomplish this function, three different parameter fields are required, one field IM# 452 is used to select the IMemory, one field instruction fetch count (ifc) 454 specifies the number of instructions to be fetched, and a starting memory address of the block of instructions is specified in field 456. Though immediate fields have been used to present the instruction types it is realized that many of the fields could specify a register to contain the desired parameter to be used.

In the present example of the inventive architecture, the WIM program's method of specifying branching functions is by the use of 64-bit WinF instructions. There are a number of branching types that may be specified in any particular implementation. Examples of three branching types are discussed next. These three include unconditional and conditional forms of branches and an auto-looping mechanism. For Mfetch instructions, an unconditional branch to a new WIM address is specified as: Mfetch IM0address, IM1address, . . . , IMkaddress, WIMBranchAddress, where the IM0-IMk addresses are the addresses of the separate instruction memories located in the arithmetic/logic units and the WIMBranchAddress specifies the direct address for the next WIM instruction. It is appreciated that architectures and implementations can be developed that use indirect, base plus index, and other forms of instruction addressing to specify the effective addresses for the next WIM instruction and the multiple separate IMemories. The direct addressing form is shown as a representative example. It is noted that by architectural definition for single cycle instruction fetch access pipelines, the unconditional branch causes no branch latency in the program flow.

Another branching form is a when-to-branch instruction with explicit condition timing parameters: Mfetch IM0address, IM1address, . . . , IMkaddress, W/I, Ctime, Tbranch, Fbranch, where IM0-IMk addresses are the addresses of the separate instruction memories located in the arithmetic/logic units, W/I specifies where the condition is to be determined either in WinF logic or in the arithmetic/logic units, Ctime represents the number of cycles previous to or, if of value to a processing system, after the present cycle containing the branch instruction that specifies which instruction is to determine the branching condition. If the condition is true, then branch to Tbranch address, and if the condition is false, branch to the Fbranch address. Because of the Ctime specification, the branch portion of the instruction can be located in the WinF instruction stream appropriately for code space and performance efficiency depending upon the available hardware support for this type of instruction.

A simplified form of conditional branch uses the opcode to specify the function of the W/I field and the branching condition is determined when the conditional branch instruction is decoded. For this type of conditional branch in single cycle instruction fetch access pipelines, there is no branch latency in the execution of the original program. This is used in the following sequence to hide the latency for determining the condition. More specifically, one way to hide pipeline latency in determining a functional data dependent branching condition is to first use an unconditional branch at the point where a traditional conditional branch instruction would be used. This unconditional branch goes to a small subroutine which provides useful work while the condition is being determined. At the end of the subroutine, a conditional branch function is specified as embedded with a subroutine instruction. Since for single cycle instruction fetch access pipelines the unconditional branch causes no branch latency in the program flow and the condition for branching has been determined by the end of the subroutine resulting in no branch latency for the subroutine ending conditional branch, this method effectively hides functional data dependent conditional branch pipeline latencies under program control.

Another branching form is the auto-loop function: Mfetch IM0address, IM1address, . . . , IMkaddress, LoopCount, LoopEndaddress, where IM0-IMk addresses are the addresses of the separate instruction memories located in the arithmetic/logic units, LoopCount specifies the iteration count for the loop, and LoopEndaddress specifies the ending address for the loop. The instruction is intended to be used at the start of the loop where it is fetched for the first time of the loop as a 64-bit instruction. Once the loop is set up, the WinF can fetch the arithmetic/logic addressing portion of the instruction, for example, an Mfetch of the IMemories, and bypass the fetching of the auto-loop setup portion of the instruction. With an auto-loop on a single WIM address, the first fetch is sufficient for the loop iteration since the WIM instruction need not be refetched each cycle through the loop. Alternatively, at the expense of one cycle of latency a separate instruction can be defined and used to set up the loop parameters prior to the loop.

More specifically, FIG. 5 shows instruction format examples of four 64-bit WinF instructions 500 for a processor organization with three IMemories, IM0, IM1, and IM2. FIG. 5 shows two examples of the 3-way Mfetch 510 and 530, one with an unconditional branch 510 and one with a conditional branch 530, one example of a 4-way Mfetch 550 for use in a system containing an additional instruction memory subsystem, in this case, specifically identified for control-I/O instructions, such as I/O controller functions, and an instruction format 570 for an auto-loop function.

The 3-way Mfetch with branch format 510 contains some of the same fields as in the 32-bit instruction format case though this commonality is not required but has been chosen to minimize implementation costs. For example, a width field W 512 where W=1 for 64-bit instructions, an opcode field 514, a tag associated with the selected AVLI is specified in itag field 516, three expanded address range IMemory address fields IM0 518, IM1 520, and IM2 522 represent direct addresses to the IM0, IM1, and IM2, respectively. The expanded IMemory address range is presented as an exemplary option which may or may not be appropriate depending upon an implementation's requirements. It is noted that the itag is not a required field in the WinF instruction format, but can be directly and more flexibly associated with the IMemories. Another address field 524 is used for directing WinF to a new address in the WIM.

The 3-way Mfetch with conditional branch format 530 contains similar size IM0 532, IM1 534, and IM2 536 address fields to the address fields used in the 32-bit Mfetch 410. There are two additional fields in instruction type 530 which pertain to a conditional branch function where if a condition specified by the opcode 537 tests true then the WinF fetches instructions from the WIM beginning at Tbranch address 538. Otherwise, if it tests false, the WinF fetches instructions from the WIM beginning at Fbranch address 540.

An example of a third instruction type is for a 4-way fetch with branch instruction format 550 which specifies an instruction selection address for an additional memory as for example an I/O controller function. For this purpose, the new instruction memory is to be addressed by direct address 552. Address field 554 is used for directing WinF to a new address in WIM.

A fourth instruction type 570 for a 3-way fetch with auto-loop is used to set up an auto-loop function. Two new fields are a loop count field 572 to specify the number of iterations of the loop and a loop end address field 574 to identify the end address of a code loop. The auto-loop function is described in further detail below in connection with the discussion of a program example.

Figure 6A:
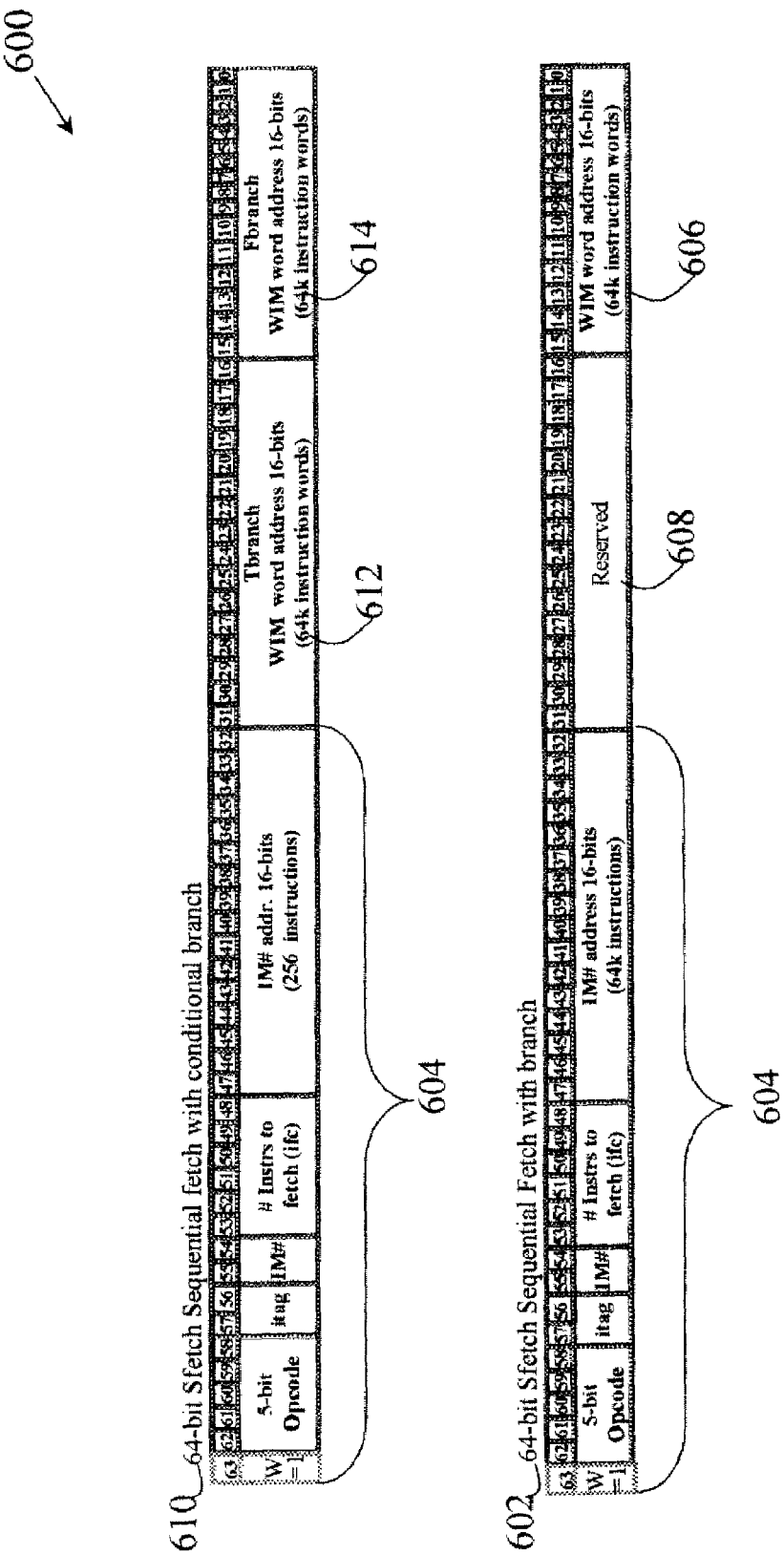
FIG. 6A illustrates a second set of examples of WinF 64-bit IF instruction formats.

FIG. 6A presents two examples of 64-bit Sfetch instructions 602 and 610, one with an unconditional branch 602 and one with a conditional branch 610. The field of bits 604 in both instruction formats 602 and 610 are the same format as the 32-bit Sfetch instruction 450 of FIG. 4. Concatenated to the 32-bit Sfetch instruction form is WinF address information. In instruction 602, a WIM address 606 is used to direct the WinF addressing to a new WIM location. A reserved field 608 is also contained in instruction 602. In the Sfetch with conditional branch instruction 610, a Tbranch address 612 and a Fbranch address 614 specify the branch address depending upon the true or false state of the opcode specified condition. In both instructions 602 and 610, the branch operation occurs after the sequential execution of the specified block of instructions.

Figure 6B:
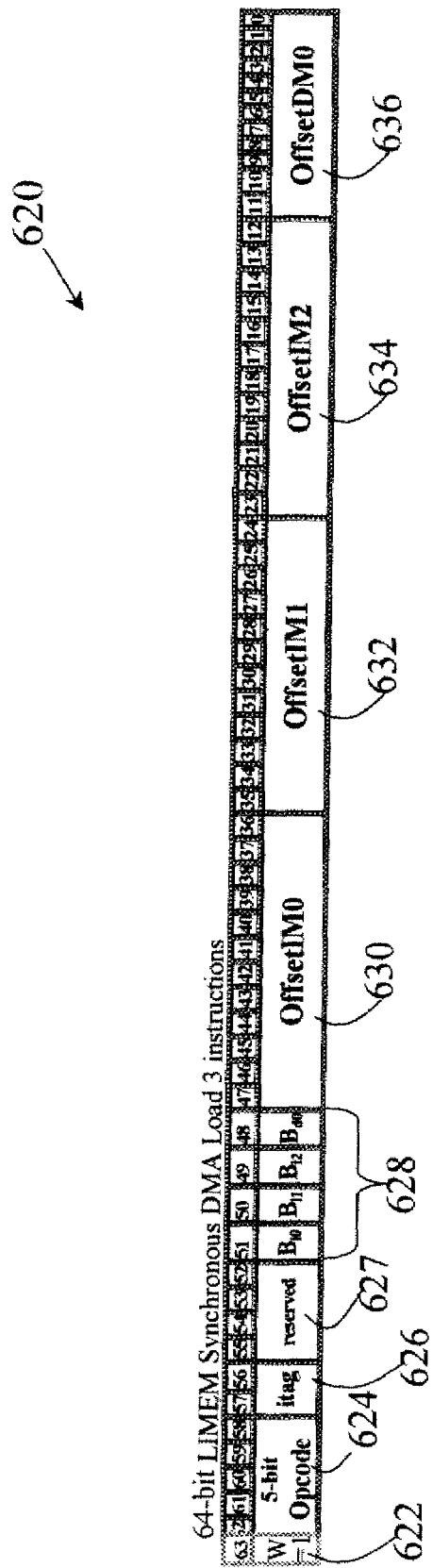
FIG. 6B illustrates an example of a WinF 64-bit LXI synchronous DMA instruction format.

FIG. 6B illustrates an example of a 64-bit Load IMEM Instruction (LIMEM) 620 which acts as a synchronous DMA instruction to load three instructions into three IMemories. This instruction is discussed below in further detail.

Figure 6C:
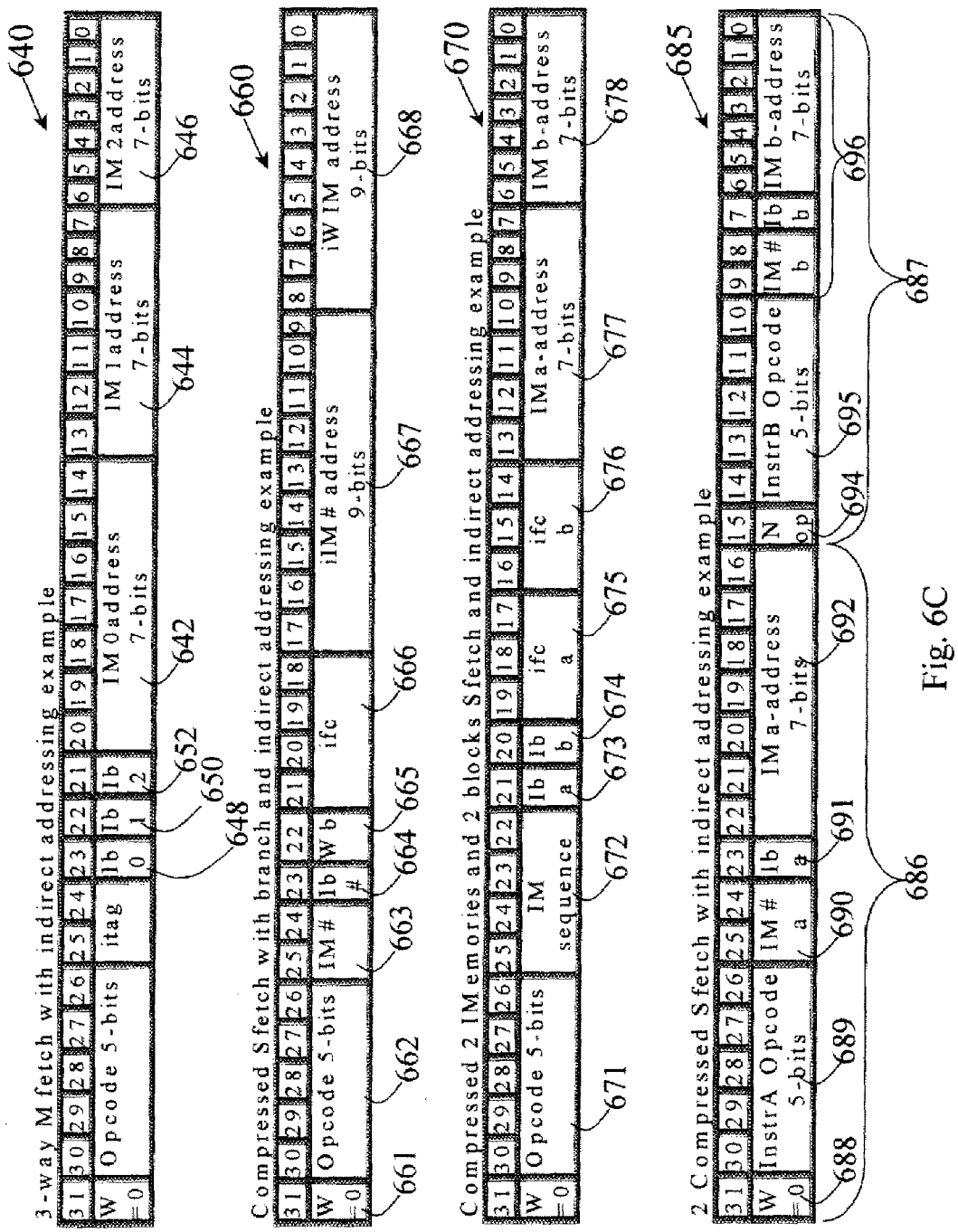
FIG. 6C illustrates all example of a 3-way Mfetch with indirect addressing format and formats for three Sfetch instructions with indirect addressing.

It is noted that, even though only direct addressing of the IMemories is specified in the examples shown in FIGS. 4, 5, and 6A, indirect addressing mechanisms could also be specified. To give an example, instruction format 640 of FIG. 6C illustrates a 32-bit Mfetch which is used with indirect addressing. The changes between the Mfetch 410 with direct addressing shown in FIG. 4 is that the direct addressing fields 418, 420, and 422 are reduced to 7-bits in fields 642, 644, and 646 and new base register selector fields Ib0 648, Ib1 650 and Ib2 652 are added. Each base register selector field specifies one of two IMemory base address registers whose contents are added to an IMemory address field to create an effective address for the specified IMemory. A second example of an instruction format 660 using indirect addressing is shown in FIG. 6C. This instruction 660 is a compressed 32-bit version of 64-bit Sfetch with branch instruction 602 of FIG. 6A. In instruction 660, width field W 661 is 0 indicating it is a 32-bit instruction, the opcode is defined in 5-bit field 662, the IMemory to use is specified in IM# field 663, an indirect base address register selection field Ib for the selected IM# is specified in field 664, an indirect base address register selection Wb for the WIM is specified in field 665, the number of instructions to fetch from the selected IM# is specified in ifc 666, and an indirect address field, which is added to the selected Ib register is given in a 9-bit field 667. An indirect address field, which is added to the selected Wb register is given in a 9-bit field 668.

A third example, instruction 670, is also shown in FIG. 6C. In instruction 670, two Sfetch instruction-block sequence instructions are compressed into a 32-bit format (W–0) and specified by opcode 671. The two blocks of IMemory instructions have a fixed sequential order of execution where the "a" block of instructions is executed first followed by the execution of the "b" block of instructions. The blocks can be located in any two of IMemories. For example, with three IMemories the six sequences (IM0, IM1), (IM0, IM2), (IM1, IM0), (IM1, IM2), (IM2, IM0), (IM2, IM1), where the a and b blocks are located in the ordered pairs as (a-block IM#, b-block IM#), are encoded in the IM sequence field 672. There are two base address registers, Ib-a 673 and Ib-b 674, that are used in indirect addressing of both the a and b blocks. The number of instructions in the a-block is given by ifc-a 675 and the number of instructions in the b-block is given by ifc-b 676. The address fields to be added to the selected base address registers for the selected IMa-address and IMb-address are given in fields 677 and 678, respectively.

A fourth example, instruction 685, is also shown in FIG. 6C. In instruction 685, two Sfetch instructions 686 and 687 are compressed into a 16-bit format. These two instructions have a fixed sequential order of execution where the 16-bit Sfetch instruction 686 is executed first followed by the execution of instruction 687. To determine the instructions are of the 16-bit format, fields 688 and 689 are decoded together indicating the compressed format and addressing operation type. Field 690 specifies the IMemory to be fetched from and one of two base registers are selected by bit 691 whose base register value is added with the immediate address value 692 for an indirect addressing operation. The second instruction 687 is executed next if the NOP bit 694 is inactive. If it is active, then the instruction 687 is treated as a NOP. Alternatively note that a NOP can be specified in the opcode field 695. In the exemplary instruction 685, the second instruction 687 is specified as an indirect addressing instruction utilizing fields 696 similar to fields 690, 691, and 692 of the first instruction 686.

A WinF load base register instruction is used for loading the indirect addressing base registers. It is also noted that the Wings code splitting tool takes into account the use of WinF instructions of different lengths. Further, a result of using the 32-bit form of Sfetch instructions is that the original program's functional storage requirements can possibly be reduced, especially where duplicate instructions are removed from the original program.

Figure 7:
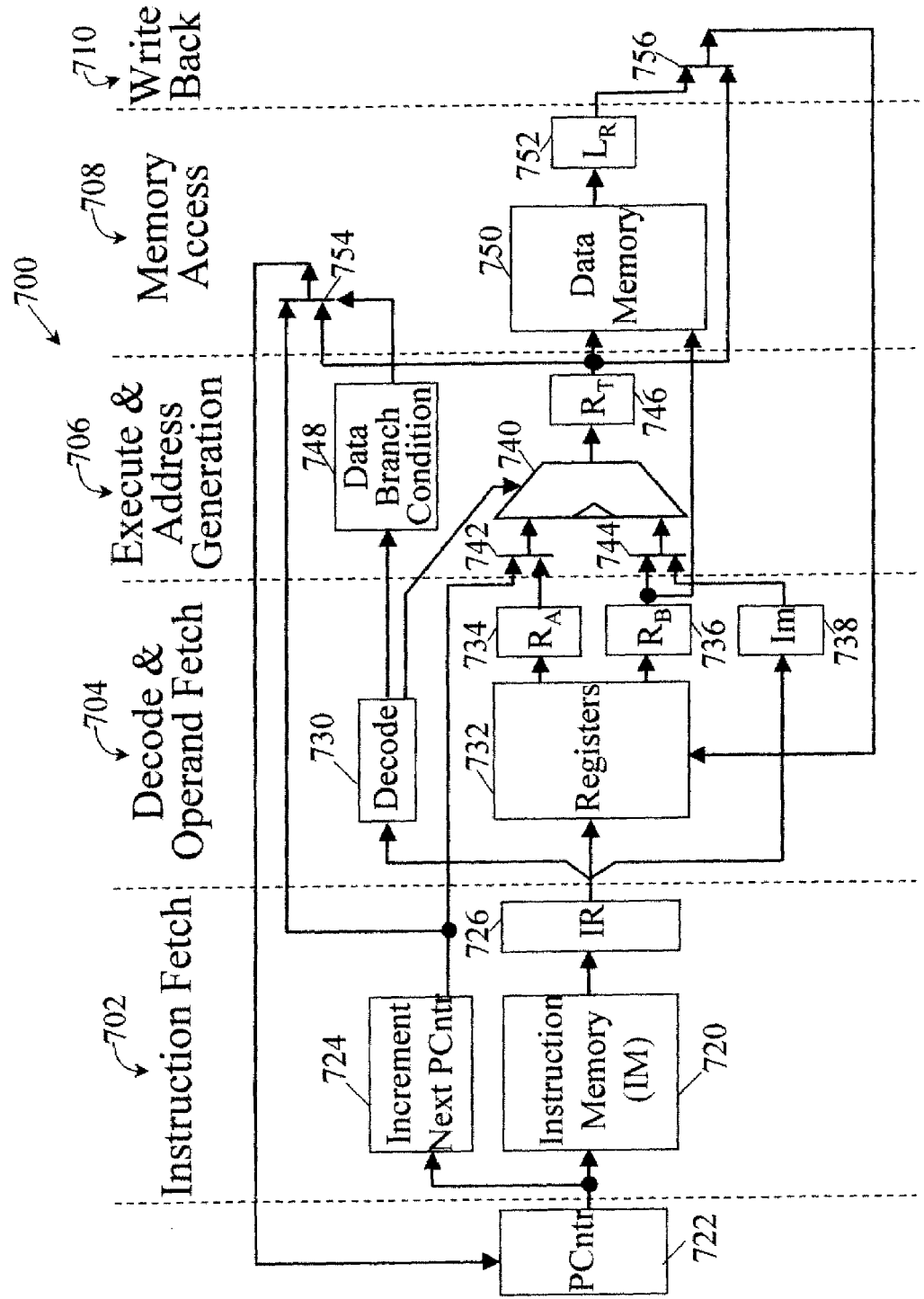
FIG. 7 illustrates a prior art load/store register file processor, the DLX.

An example of a programmable fetch implementation is shown in FIG. 7 for a simple prior art load/store processor architecture known as the DLX processor. The prior art DLX processor was first presented as a teaching aid by Hennessy and Patterson and is described in detail in their book "Computer Architecture A Quantitative Approach", $2^{nd}$ edition, by John L. Hennessy and David A. Patterson, © 1990, 1996 Morgan and Kaufmann Publishers, Inc, hereafter referenced as Hennessy and Patterson. A DLX processor, such as processor 700 of FIG. 7 follows a pipelined design with five major stages, instruction fetch 702, decode and operand fetch 704, execute & address generation 706, memory access 708, and write back 710. Instructions are fetched from instruction memory 720 in an instruction fetch cycle 702 using an address From a program counter (PCntr) 722. The PCntr 722, stores an instruction memory physical address that is updated sequentially 724 during the instruction fetch cycle 702 unless it is modified by a control instruction, such as a branch, or an interrupt. The fetched instruction is latched in an instruction register (IR) 726. During the decode and operand fetch stage 704 selected fields of the latched instruction are decoded 730 and used to select operands from a set of registers 732. The retrieved operands are stored in their own registers namely $R_A$ 734 and $R_B$ 736. An immediate register (Im) 738 value is retrieved directly from a selected field in the latched instruction 726. In the execute and address generation stage 706, the instruction is executed based on the decoded instruction in a function execution unit 740 with inputs from multiplexers 742 and 744 that provide a selection of either register operands, immediate values, and/or a next-PCntr value. The result of the execution is stored in a target register $R_T$ 746. Also, during the execution stage 706, different data conditions 748 are determined, for example, conditions resulting from the function execution. In the fourth pipeline stage 708, a register value may be stored in a data memory 750 (store operation) or a data value can be accessed from the data memory 750 (load operation). In either case, the $R_T$ result from the previous stage is used as an address for accessing the data memory. A load operation data value accessed from the data memory is stored in a register $L_R$ 752, In addition, a calculated branch address or the next PCntr is selected in multiplexer 754. During the write back stage 710, a calculated result $R_T$ 746 or an accessed data value $L_R$ 752 selected via multiplexer 756 is written back to the set of registers 732. Please note that for reasons of clarity in presenting the basic data flow, as was done in the original DLX documentation Hennessy and Patterson at page 130, FIG. 3.1, all pipeline latches and control logic/signals for the multiplexers, registers, and memories are not shown. Only the primary data paths and major pipeline blocks are shown.

It is noted that the original DLX documentation covered only a simple branch condition example, but more complex conditions are not unusual and to highlight their affect on branch latency note that the data branch condition 748 determination is maintained in the execute and address generation stage 706 of the pipeline. Since the PCntr is updated every cycle so that a new instruction can be fetched every cycle, the later stage determination of a branch condition causes a bubble or delay in the normal instruction pipeline sequence. In the pipeline of the DLX processor 700 of FIG. 7, a branch condition 748 is determined which is used to selectably control multiplexer 754 so that either the next PCntr value or a calculated address value to be loaded into the PCntr is used to address the instruction memory 720.

Figure 8:
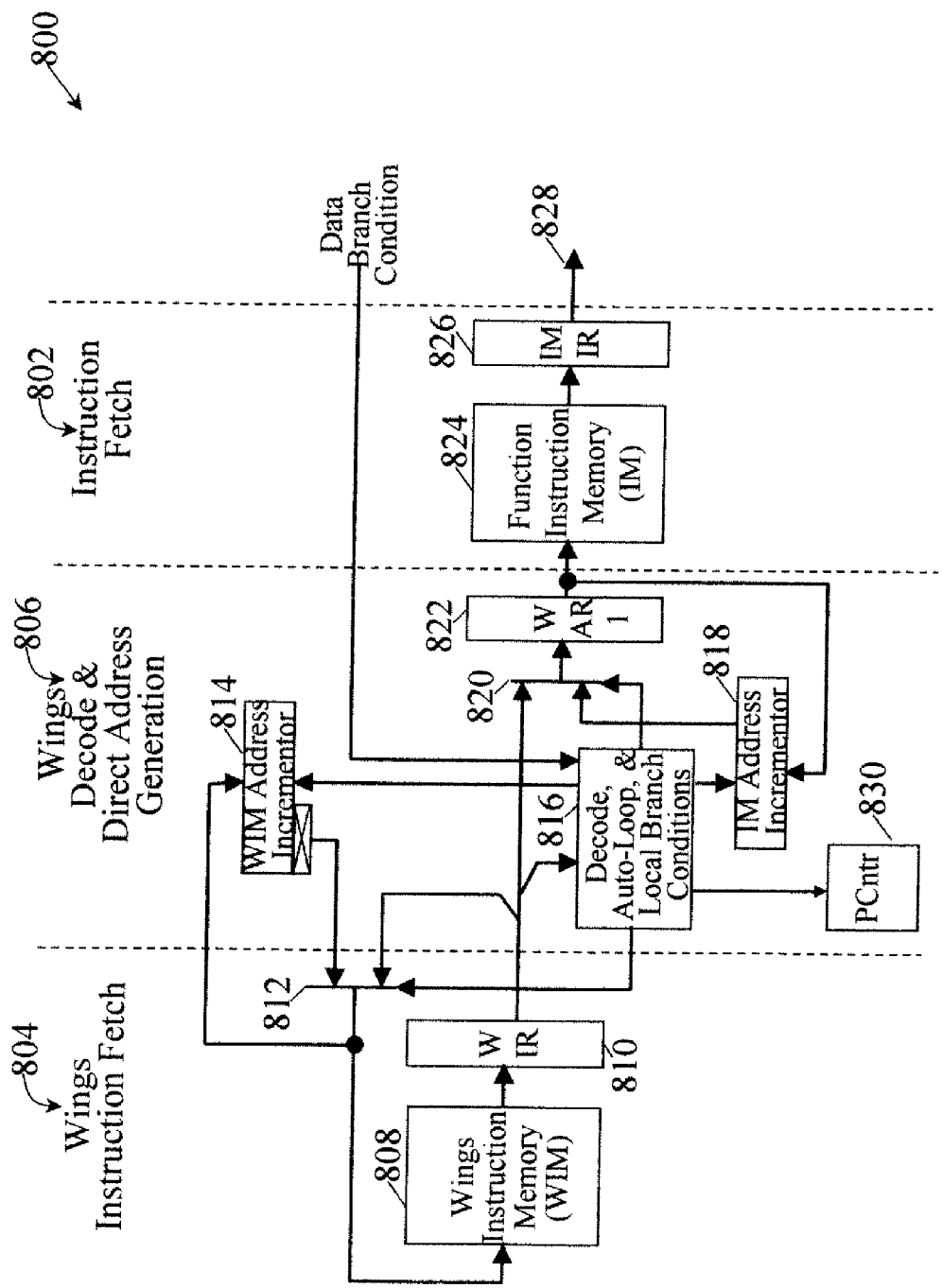
FIG. 8 illustrates a first example of a programmable instruction fetch pipeline supporting one function instruction memory.

The Wings intelligent fetcher replaces the PCntr 722 and the Increment Next PCntr 724 blocks with a programmable instruction memory address generation function unit for a single function IMemory as shown in the exemplary Wings DLX processor 800 of FIG. 8 where only an instruction fetch stage 802 is illustrated without an increment next PCntr block. The other stages of the DLX remain essentially the same except for how control structure functions operate that affect the PCntr such as a conditional branch control function for loading the DLX PCntr.

It is known that with different pipeline assumptions numerous pipelines can be created, but the basic principles of the Wings Meta-Architecture of maintaining a program's control structures in a memory separate from the program's function instruction memories can still be maintained in these pipeline alternatives. To illustrate the implementation of these principles, the pipelines used in the following examples of Wings implementations assume a balanced delay design among the stages and that all memory accesses can be accomplished in a single cycle. In the next sections, two pipeline examples are addressed, one shown in FIG. 8, which assumes that the WIM instructions use only a simple form of addressing identified as direct addressing, and one shown in FIG. 9, which assumes that the WIM instructions include direct addressing instructions as well as more complex addressing forms of instructions.

In continuing with the pipeline of FIG. 8, two new pipeline stages are shown, one for Wings instruction fetch 804 and one for Wings decode and direct address generation 806. The Wings instruction fetch stage 804 consists of a separate Wings instruction memory (WIM) 808 which contains the IF instructions generated from an original compiled/assembled program. The IF instructions fetched are latched in a Wings instruction register (WIR) 810 by the end of this cycle. The address for the WIM is selected by multiplexer 812. The Wings decode and direct address generation stage 806 contains the address generation functions for both the WIM 808 and the IM 824. Since the instructions stored in the WIM are to be accessed sequentially or when a WIM instruction contains a WIM address field, the multiplexer 812 selects either a WIM address incrementor value 814 or a WIM address field of the WIR 810. Note, for example, using the WIM sequential fetch instruction 450 of FIG. 4, the next WIM instruction is to be fetched sequentially, but not until all the instruction fetch count (ifc) 454 IM instructions have been fetched. In this case, the WIM 808 is accessed first, thereby initiating the sequential fetch of a block of instructions from the IM 824 and then the WIM is accessed after the block of instructions have been fetched. The sequential fetch with branch instruction 602 of FIG. 6A illustrates another case where the next WIM instruction to be fetched is from the WIM word address field 606 which is used as a direct address to the WIM 808. The control of the multiplexer 812 is from the decode, auto-loop, and local branch conditions block 816. Block 816 decodes the latched WIM instruction from the WIR and also controls the IM address incrementer 818 and multiplexer 820. The multiplexer 820 selects either the path from the IM address incrementer 818 for sequential addressing of the IM 824 or from a selected IM address field of the WIR 810. For example, for the WIM sequential fetch instruction 450 of FIG. 4, the IM starting address 456 is used for the first access of the IM 824 and thereafter this address is incremented 818 sequentially accessing "ifc" instructions from the IM 824. The generated IM address is latched in Wings address register (WAR1) 822 at the end of pipe stage 806. It is noted that depending on the cycle time requirements of the processor and the complexity of the Wings decode and direct address generation logic, the two pipeline stages 802 and 806 could be merged into a single pipeline stage and no pipe stage latches would be required between them, such as the register WAR1 822. Instructions fetched from the IM 824 are latched in IM instruction register IMIR 826 which supplies instructions 828 to, for example, the decode and operand fetch pipeline stage 704 of FIG. 7.

Note that data branch conditions do not directly affect the addressing of instructions in the IM 824, but rather affect the accessing of instructions in the WIM 808. All branch and conditional branch instructions in the examples of FIG. 5 and FIG. 6A contain a direct branch address in the instruction. For example, sequential fetch with conditional branch instruction 610 of FIG. 6A contains a direct WIM address 612 for a true condition and a direct WIM address 614 for a false condition. One of these two fields is selected by multiplexer 812 depending on the data condition. It is noted that other branch and conditional branch instruction types are possible with extended 32-bit addressing range. For example, in the case of conditional branches, a fall through to the next sequential address on a true (false) condition and branch to a direct 32-bit address on false (true) condition can be architecturally defined. For the 32-bit addressing range case, the conditional branch instruction 610 of FIG. 6A would only have a single 32-bit WIM address field encompassing the bit fields 612 and 614.

The PCntr 830 may maintain a reference address to instructions in the original compiled/assembled program for debug and test purposes. For cost reasons, this function need not be located in an implementation but may be associated with the program data set.

Figure 9:
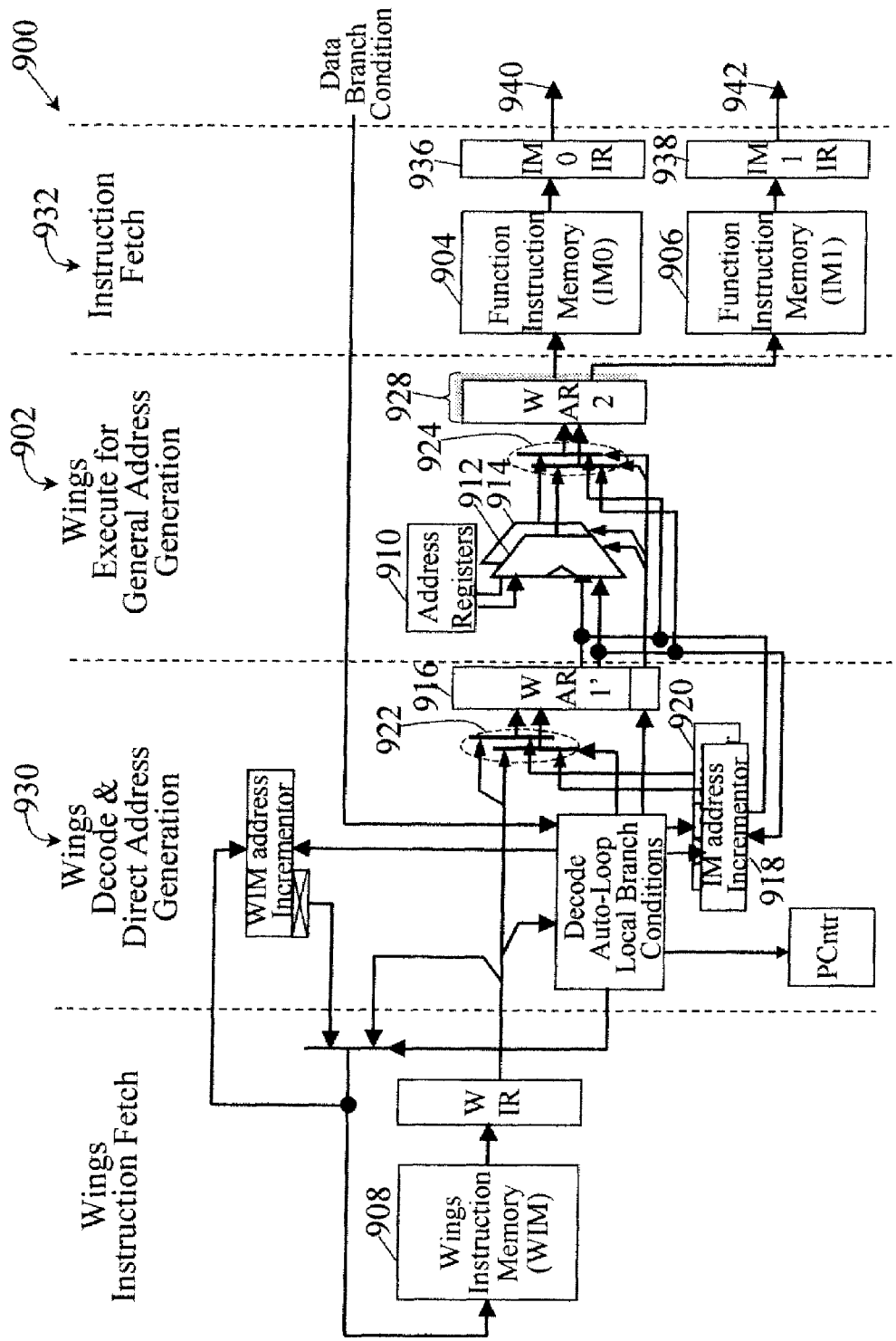
FIG. 9 illustrates a second example of a programmable instruction fetch pipeline supporting two function instruction memories.

FIG. 9 illustrates a programmable instruction fetch position 900 of a pipeline that supports direct addressing as well as more complex addressing forms of WIM instructions, such as the examples of indirect addressing instruction formats of FIG. 6C. An additional pipeline stage 902 is added to the exemplary pipeline 800 shown in FIG. 8 to support Wings execute functions for general address generation. In addition, two function IMemories, IM0 904 and IM1 906 are supported allowing Mfetch instruction types to be used in the compiled/assembled/split program and stored in the WIM 908. This stage 902 includes the base address registers Ib0-2 selected from a set of address registers 910 which are added by adders 912 and 914 to latched versions IM0address 642 and IM1address 644 of FIG. 6C from the output of latch 916. In addition, the two IMk addresses may be incremented independently, by incrementers 918 and 920, depending upon the stored instruction. Either the direct address values or incremented address values are selected via multiplexers 922 for storage in WAR1 registers 916. The indirect addresses calculated in stage 902 via adders 912 and 914 are selected by multiplexers 924 for storage in WAR2 registers 928. These latched values are used to address the two IMemories IM0 904 and IM1 906 in the next pipeline stage. It is noted that depending on the cycle time requirements of the processor and the complexity of the Wings decode and direct address generation logic 930 and the Wings execute for general address generation logic 902 the three pipeline stages 902, 930, and 932 could be optimized into two pipeline stages, or possibly even one stage with long enough cycle times, thereby reducing overall complexity and pipeline stage latency for various functions. Instructions fetched from IM0 904 and IM1 906 are latched in IM instruction registers IM0IR 936 and IM1IR 938, respectively, The IM0IR 936 and IM1IR 938 supply instructions 940 and 942, respectively, to two duplicate decode and execute pipelines to complete the execution of the two fetched instructions.

Figure 10A:
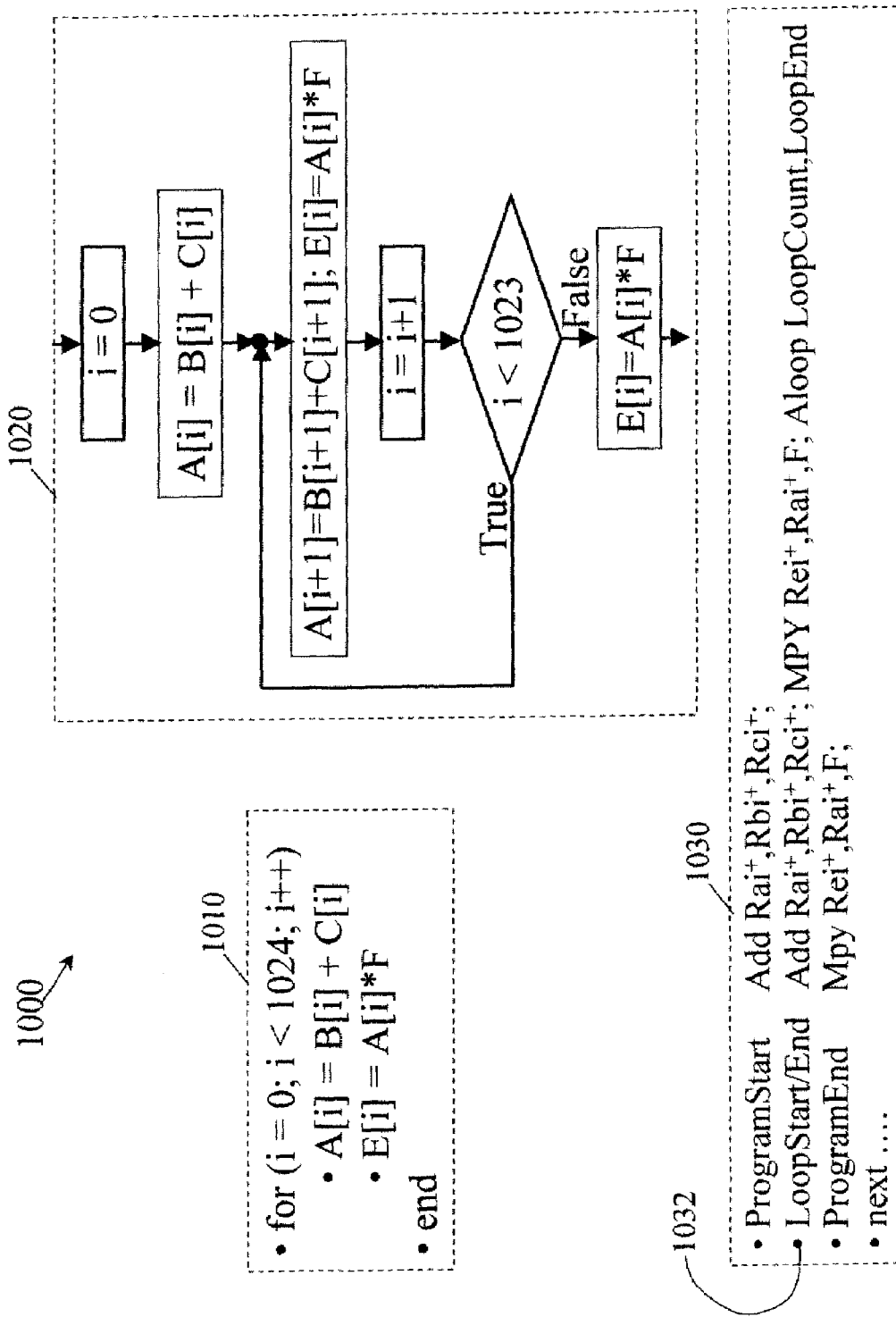
FIG. 10A illustrates a simple auto-loop program example.
Figure 10B:
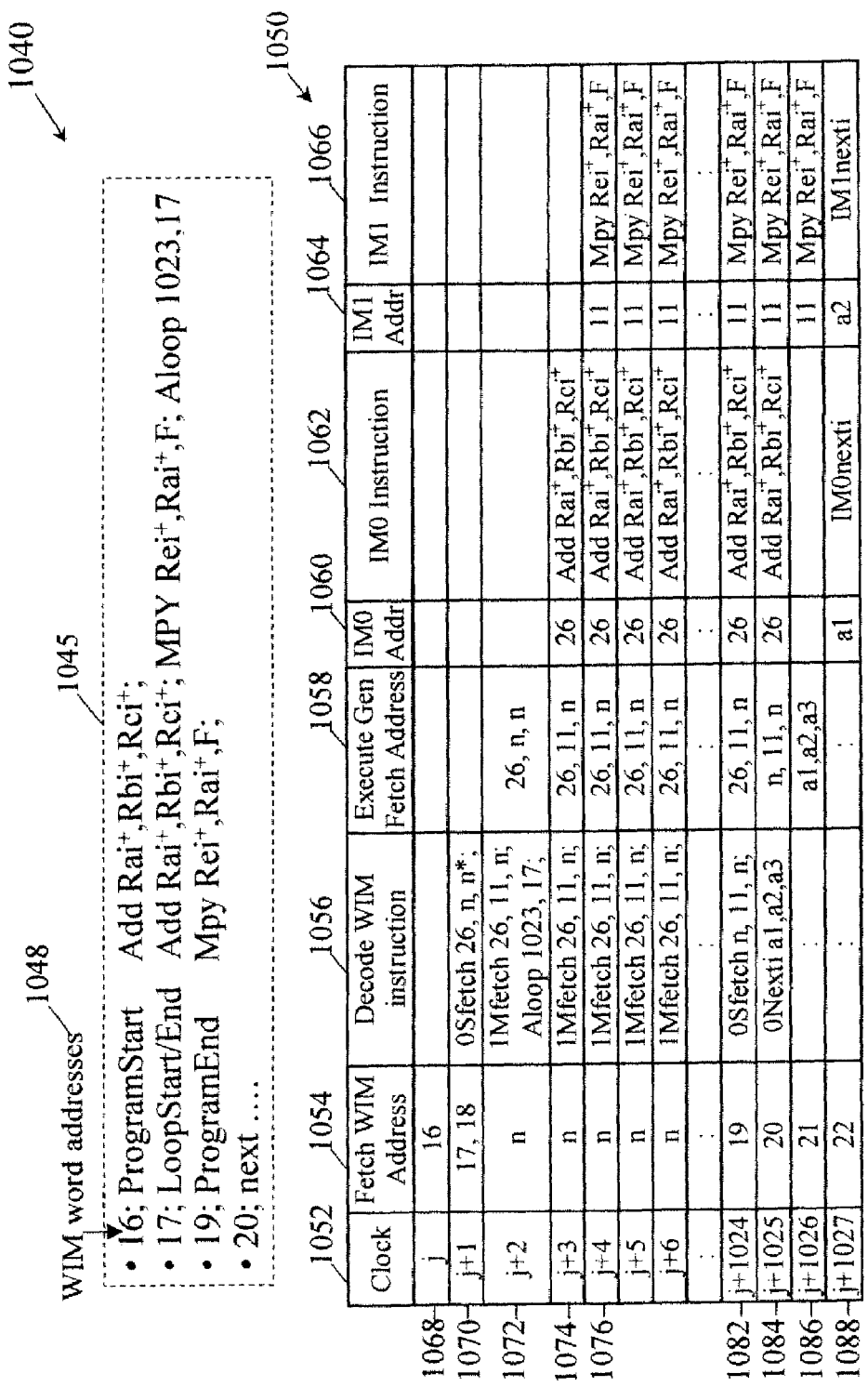
FIG. 10B illustrates a WinF pipeline timing chart for the auto-loop example of FIG. 10A.

A simple exemplary program 1000 is presented in FIG. 10A using an auto-loop function. A program 1010 adds vector B with vector C to create a new vector A and multiplies the elements of the new vector A by a constant F to create a new vector E. All vectors are 1024 elements. This program is shown in flow chart font 1020 consisting of a simple software pipeline loop for the 1024 element operations required in each vector operation. An assembly version of the loop using vector instructions and an auto-loop feature of the processor is shown in program 1030. This program 1030 shows that with software pipelining the single line labeled LoopStart/End 1032 is repeated specifying the vector add of the next element is accomplished in parallel with the multiply of the previously calculated A element. Vector operand address incrementing, indicated by a superscript $^+$, is assumed for this processor where the hardware causes the operand addresses to be adjusted as specified by vector parameters. The vector function is discussed later in more detail. Since in this example the loop count is known, an auto-loop function is set up on the first operation of the first iteration of the loop. The auto-loop instruction 570 of FIG. 5 requires the instruction be used in the loop start address so that the start address can be saved by hardware for use in loop address generation. FIG. 10B shows the program and pipeline composite 1040 for this example requiring two IMemories to support the parallelism in the program. The program 1045 is the same program 1030 listed in FIG. 10A with the addition of WIM word addresses 1048 indicating the program begins at 32-bit word address 16 with the program LoopStart and LoopEnd address being address 17 containing a 64-bit auto-loop instruction. The pipeline 1050 is shown as a table made up of a number of columns that shows the progress of the program as it is being executed on a Wings processor. Column 1052 indicates the processor clock cycle to track the major events that occur in the processor for the execution of the program. Column 1054 shows the WIM fetch addresses, column 1056 indicates the WIM instructions that are fetched at the address specified in column 1054 and then decoded, column 1058 shows the generated addresses from the WinF unit that are applied to the IMemories, column 1060 shows the IM0 addresses that are applied, column 1062 shows the IM0 instructions that are fetched at the specified IM0 addresses, column 1064 shows the IM1 addresses that are applied, and column 1066 shows the IM1 instructions that are fetched at the specified IM1 addresses. Note that a shortened form of the instruction syntax is used for ease of representation in the figures.

The program 1045 begins at clock cycle 1068 with the fetching of WIM address 16. At the next clock cycle j+1 1070, a 64-bit WinF instruction is fetched at address 17, 18 and the WIM instruction [0Sfetch 26, n, n;] is decoded. Note that "n" indicates not used. At clock cycle j+2 1072, the auto-loop hardware stops the WIM address generator, since the auto-loop is a single address loop and the instructions in the loop need not be fetched again, the instruction at WIM address 17, 18 [1Mfetch 26, 11, n;||Aloop 1023, 17;] is decoded, and an IMemory address (26) is generated in the WinF unit. Proceeding to the next clock cycle j+3 1074, the WinF hardware reuses the [1Mfetch 26, 11, n;] loop instruction instead of fetching it again, decodes the previously fetched instruction [1Mfetch 26, 11, n;], generates the next IMemory addresses (26, 11), and fetches the IM0 instruction [Add Rai$^+$, Rbi$^+$, Rci$^+$;] at IM0 address (26). At clock cycle j+4 1076, the WinF hardware reuses the [1Mfetch 26, 11, n;] loop instruction instead of fetching it again, decodes the previously fetched instruction [1Mfetch 26, 11, n;], generates the next IMemory addresses (26, 11), fetches the IM0 instruction [Add Rai$^+$, Rbi$^+$, Rci$^+$;] at IM0 address 26, and Fetches the IM1 instruction [Mpy Rei$^+$, Rai$^+$, F;] at IM1 address 11. This cycle is repeated updating the loop counter until the loop completes with the last multiplication with the instruction from WIM address 19 1082. The Nexti instruction follows and the execution steps for this instruction are shown in the sequence 1084-1088.

The full processor pipeline is not shown in FIG. 10B since the arithmetic/logic unit portion of the processor has not been described yet. There are many possibilities for the architecture and implementation of the arithmetic/logic portion of the processor which depends upon the requirements for the processor being designed. Emulation of existing architectures such as the Intel Pentium processors, IBM's PowerPC, and other register-to-register RISC like processors is perfectly feasible using the basic Wings meta-architecture. To give an interesting example of the flexibility of the novel Wings meta-architecture, it is noted that to achieve high performance a load/store register based processor design is not a necessity and that many of the restrictions typically ascribed to memory-to-memory processors can be alleviated with the Wings meta-architecture. It is noted that in commercial processors using a load/store register file design, the first level memory, typically caches, must keep up with the processor speeds thereby minimizing performance loss due to the memory subsystem. The memory subsystem is typically a hierarchy of memory units each with varying performance and capacity at each level in the hierarchy in order to keep the register files filled with data and the execution units more fully utilized. A memory-to-memory processor would eliminate the register file level of the hierarchy if the first level memory could be designed and addressed properly since we see that performance is not the primary gating issue in choosing a memory-to-memory architecture and high performance memories can be and have been developed. A memory-to-memory architecture has traditionally been deemed inefficient due to the large instruction format space needed for operand addressing, the number of operand ports needed for multiple issued instructions, and the need for additional memory capacity and bandwidth for the storage of temporary variables as compared to a register-to-register architecture. Even though the Wings meta-architecture does not preclude the development of a load/store register file architecture, it is noted that the Wings meta-architecture addresses a number of the criticisms of the memory-to-memory architecture. Wings, with the use of the assembled variable length instructions (AVLIs), removes the restriction on fixed instruction word size, a characteristic of both single instruction and VLIW architectures. By use of the code spitting tool, all or a majority of duplicate arithmetic/logic type instructions can be removed and only a single instance or a small number of copies of the instruction is required to be stored in the IMemories thereby compressing the storage of the arithmetic/logic instructions. By specifying a mixed memory-to-memory and register-to-register design, as will be discussed, it is possible to minimize the number of operand ports needed and minimize the need to store temporary variables in the memory space.

Figure 11:
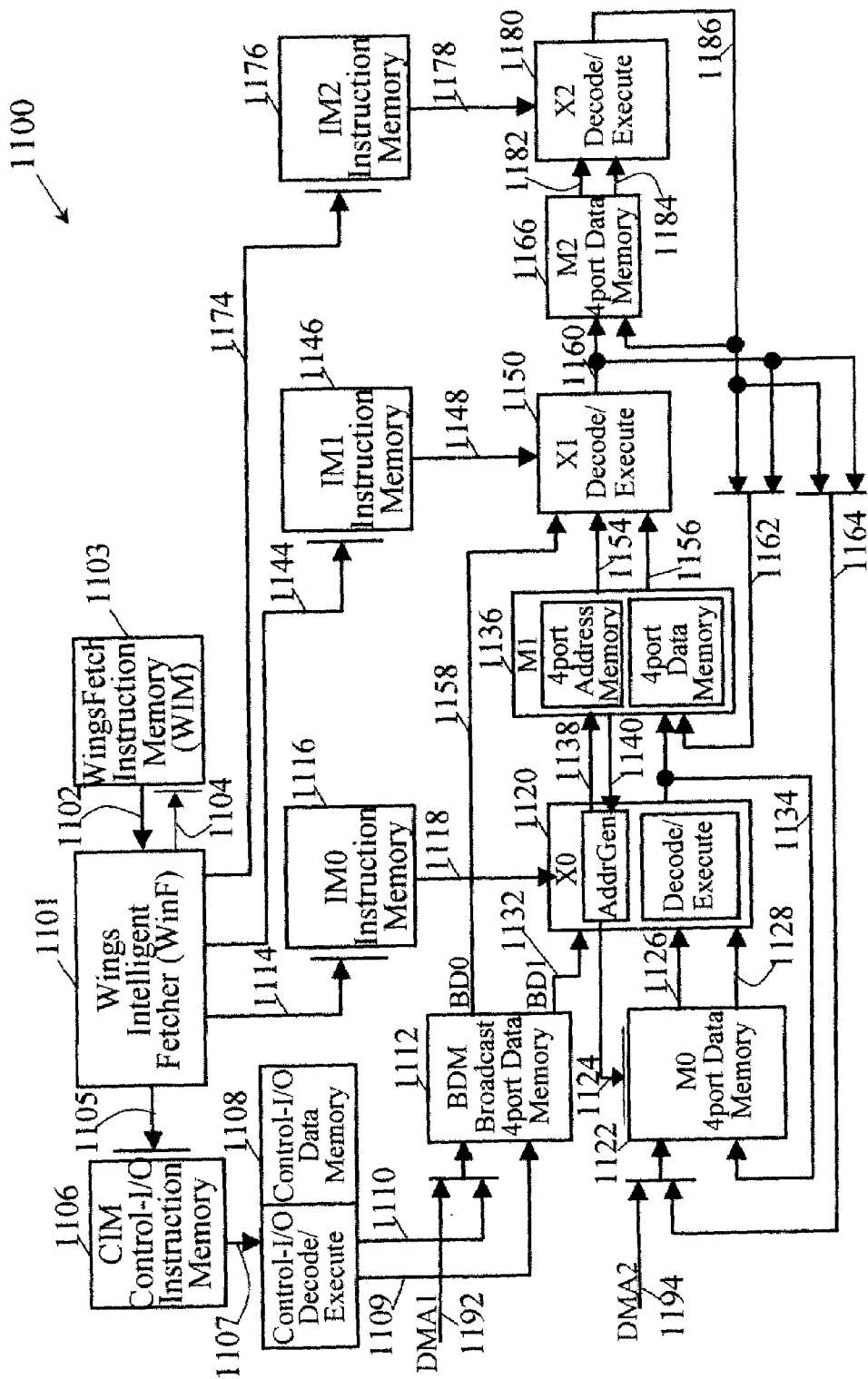
FIG. 11 illustrates a high-level logical instruction and data flow for one example of a Wings AVLI processor.

FIG. 11 illustrates an exemplary three IMemory Wings processor system 1100 that is a representative Wings architecture platform for future processors. Note that only the primary interfaces, instruction, and data paths are shown for clarity. In FIG. 11, a WinF unit 1101 receives instructions 1102 from a Wings instruction memory (WIM) 1103 as selected by addresses 1104 generated in the WinF unit 1101. The WinF 1101 generates multiple addresses based upon the execution of the instructions received from the WIM 1103. These addresses drive the fetching logic for the other instruction memories in the system. To begin with, the WinF generates instruction addresses 1105 and fetch logic for a control-I/O instruction memory (CIM) 1106. The control instructions 1107, useful for the purposes of controlling DMA and other I/O operations, are received in a control-I/O decode/execute and control-I/O data memory unit 1108. One of the many possible data paths which the control-I/O processor may have access to is shown with data paths 1109 and 1110 for the purposes of accessing a broadcast data memory 1112.

The WinF 1101 generates instruction memory addresses and fetch sequencing for each of the IMemories, beginning with IM0 addresses 1114 for IM0 1116. The fetched IM0 instructions 1118 are received in execute unit X0 1120 where they are decoded and executed. The X0 unit 1120 uses a memory-to-memory architecture and accesses operands from its 4-port data memory unit M0 1122 using operand addresses 1124 and receives operands 1126 and 1128. Another operand source is from a special broadcast data memory 1112 over bus 1132. The X0 unit generates a result 1134 which can be received in two places, one for writing back to M0 1122 and the other to write to a second stage memory unit M1 1136. The X0 also generates addresses and address selection information 1138 for accessing address registers located in the M1 unit 1136. Address information 1140 is received from M1 for use in the address generation logic located in X0.

The WinF 1101 generates IM1 addresses and fetch sequencing 1144 for IM1 1146. The fetched IM1 instructions 1148 are received in execute unit X1 1150 where they are decoded and executed. The X1 unit 1150 uses a mixed register-to-register and register-to-memory architecture and receives operands 1154 and 1156 from its 4-port data memory M1 1136 and broadcast operands 1158 from the broadcast data memory 1112. The X1 1150 generates results 1160 which are connected via multiplexed data path 1162 for write back to M1 1136 and via multiplexed data path 1164 for write back to M0 1122. The X1 result also can be written to the next staged memory M2 1166.

The WinF 1101 generates IM2 addresses and fetch sequencing 1174 for IM2 1176. The fetched IM2 instructions 1178 are received in execute unite X2 1180 where they are decoded and executed. The X2 unit 1180 uses a mixed register-to-register and register-to-memory architecture and receives operands 1182 and 1184 from its 4-port data memory M2 1166. The X2 unit 1180 generates results 1186 which can be written to M2 1166 and are connected via multiplexed data path 1162 for write back to M1 1136 and via multiplexed data path 1164 for write back to M0 1122. Additional data paths 1192 and 1194 for DMA are shown for access to M0 1122 and the broadcast data memory 1112. Other DMA paths, for example, to the control-I/O data memory and instruction memories, are not shown for purposes of clarity.

Though there are many ways to specify the operand addressing in an architecture for a processor a simple exemplary method is chosen to illustrate the various characteristics of the present platform. A post update only addressing methodology is specified for this example of a Wings processor. In a pipelined processor, this methodology means that operand addresses are first used and then at a later timing point are updated in preparation for a future operand access. In this example, all Wings instructions are designed to execute in a single cycle and are treated as "atomic" instructions. This treatment means that more complex functions such as used in prior art designs must be split up into a sequence of multiple instructions each of which can execute in a single cycle. For example, the BOPS, Inc. Manta processor had a sum of 2 products instruction (SUM2P) which executed in two cycles. An equivalent sequence of instructions in the Wings processor would consist of a single-cycle multiply followed by a single-cycle add.

FIG. 12 illustrates a more complete illustration of a Wings processor pipeline under these specifications for the simple program example of FIG. 10B. This new pipeline chart 1200 of FIG. 12 is an expansion of the pipeline chart of FIG. 10B where a WinF pipe 1210 is as shown previously and the IM0 pipe is expanded showing the instruction execution pipe 1212-1222 and the IM1 pipe is expanded showing its instruction execution pipe 1224-1234. Specifically, the IM0 and IM1 instruction execution stages are:

IM#Addr 1212 and 1224 & IM#Instr 1214 and 1226=Fetch IM# instruction at IM# address D1/Fadr 1216 and 1228=Decode 1 & Fetch address registers D2/Fopr 1218 and 1230=Decode 2, Fetch operands & generate next operand address Ex/Wra 1220 and 1232=Execute & Write back operand addresses Wrr/Send 1222 and 1234=Write back results & Set condition registers All operands and address registers are bypassed to improve performance and these bypass paths are not shown in the processor figures such as FIG. 11 to improve clarity.

The discussion so far provides a basis for understanding some of the basic concepts of the Wings meta-architecture as applied in one processor example. Additional Wings processor architecture and organization details will be added now to the exemplary platform architecture and processor organization.

The overall processor organization is to contain a scalable array of processing elements (PEs) with the PE instruction thread controlled by a WinF unit. The WinF unit is kept separate from the array processor allowing it to be easily changed depending upon an application's requirements. This approach is in comparison to the prior art BOPS, Inc. Manta processor which merged a sequential control processor function with PE0 of the processing PE array.

The Wings processor of FIG. 11 has no traditional load or store units, rather the execution units operands are sourced directly from data memory in the first level execution unit. The operands are treated as a packed organization of k-bit data elements. For example, a common set of data elements might be 8-bit, 16-bit, 32-bit, and 64-bit elements, though other data types are not precluded by the architecture. Packed data format sizes vary by application and a scalable way of treating packed data formats is desirable. In a Wings processor with multiple PEs, packed operations may be concatenated between PEs in SIMD type operations forming larger effective packed data formats.

Figure 13:
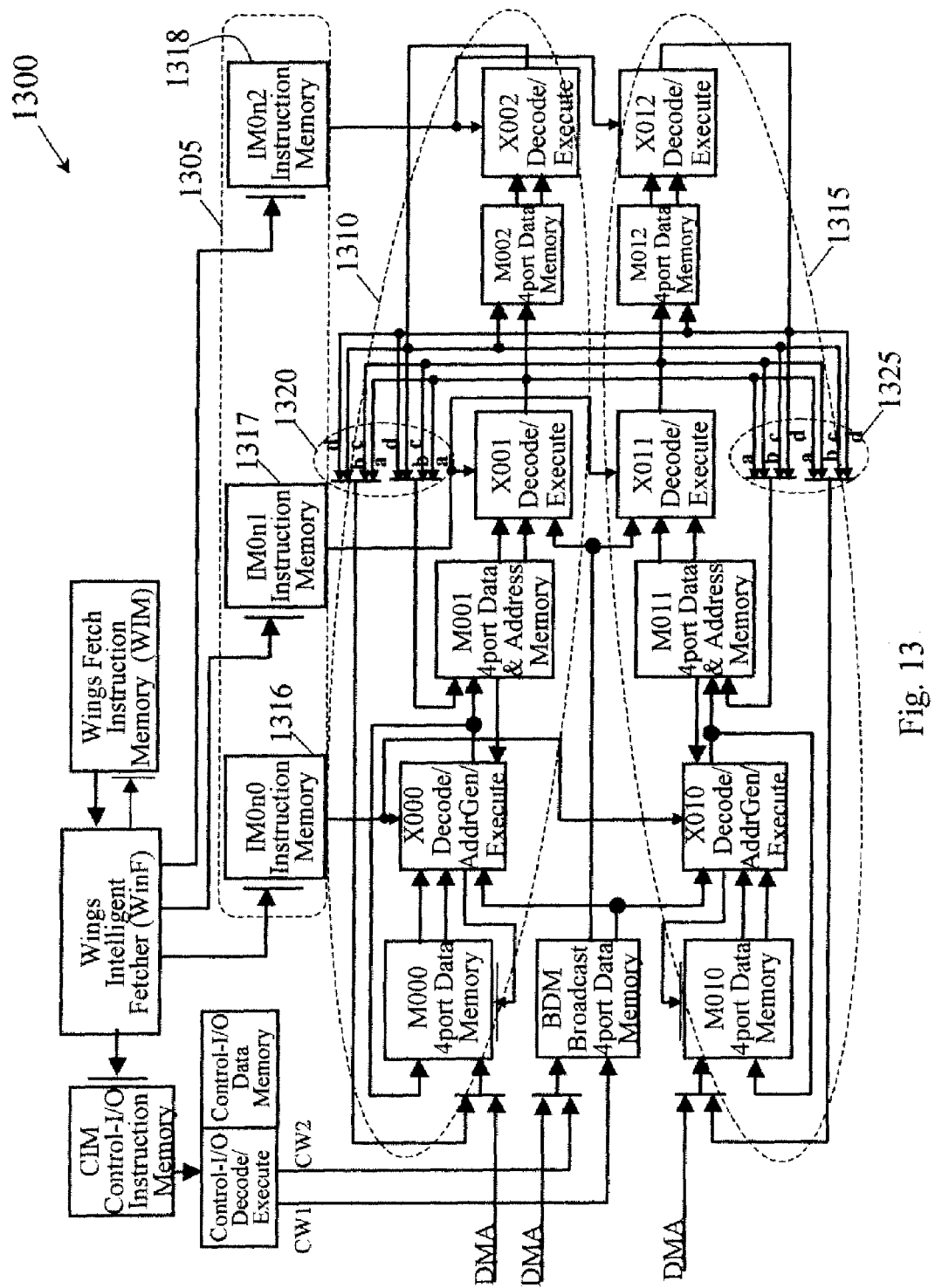
FIG. 13 illustrates a high-level hierarchical logical instruction and data flow for one example of a Wings AVLI processor with two processor elements (PEs)

To address this approach further, a hierarchical single AVLI IMemory with two PEs system 1300 is shown in FIG. 13. An AVLI, as selected by the three unique addresses for the three IMemories 1305, is specified to drive 2 PEs 1310 and 1315 in SIMD operation with full instruction capabilities. Instructions fetched from the multiple IMemories are assembled to create a single AVLI. Though the Wings meta-architecture is not limited to this manner of operation, the exemplary Wings processor architecture specifics IM0n0 1316 to store 64-bit instructions and both IM0n1 1317 and IM0n2 1318 to store 32-bit instructions for a composite 128-bit AVLI length providing up to three concurrent arithmetic/logic instructions. It is also noted that multiple execution units in parallel at each level with additional operand memory/register file ports are not precluded by the architecture. By subsetting the instructions at each cascaded level, the instruction memory IM0n0 1316 would hold either two 32-bit instructions or a single 64-bit instruction and IM0n1 1317 and IM0n2 1318 would each hold either two 16-bit instructions or a 32-bit instruction. Subset instructions can be indicated through an instruction tag or encoded in the instruction opcode. This architectural approach of using subset instructions is chosen so that different machine configurations can be obtained by concatenating PEs and their associated data types. For example, in the IM0n0-64-bit, IM0n1, and IM0n2 32-bit instruction case and with a new processor system containing eight PEs, each PE having 128-bit data paths and each two PEs configured as shown in FIG. 13, the processor configuration would act as a four PE system with 256-bit data paths in SIMD operation and each of the four PEs could have unique and different instructions. By executing subset instructions in each IMemory, for example, with IM0n0-dual 32-bit, IM0n1, and IM0n2 dual 16-bit instruction case, the same eight PE system, each PE having 128-bit data paths, would act as an eight PE system with 128-bit data paths and each of the eight PEs could have unique and different instructions. This arrangement is a hierarchical system of specifying the packed data organization tied with the number of PEs and the AVLI capabilities of the processor and will be described in more detail in a following section on systems with greater than two PEs.

One method to syntactically identify the processor elements and the internal stages uses a three field coding beginning with the level of the hierarchy, then the PE # as an independent element, and finally the internal execution/memory stages within a PE (PE level, #, stage). For listing just PE #s, the stage field is not needed. In the hierarchical system presented, when the PEs are concatenated for joint SIMD operations, the PE number is given as the (levelx), while for subset operations the PE number is given as the level and #. For example, in a two PE system such as processor system 1300 FIG. 13, a single digit per field is used such that unit 1310 is PE00 and unit 1315 is PE01 and when concatenated together for joint SIMD operations, the two separate units act as one PE identified as PE0x. For larger arrays, these fields are expanded as needed.

The IMemories in any specific processor will be of a fixed capacity and consequently a program synchronous method of loading the IMemories in addition to a DMA facility may be desirable. A specific WinF instruction type causes the loading of selected IMemories from the first level data memory. As an example, a load IMEM Instruction (LIMEM) 620 of FIG. 6B, based on 128-bit data memory M0 and 128-bit AVLIs, is used to cause the load of three IMemories from M0. The 128-bit AVLI can consist of 1 64-bit X0 and two 32-bit X1 and X2 instructions or 2 32-bit X0 and four 16-bit X1 and X2 instructions. The LIMEM call be considered to act as a synchronous DMA operation that is stored in the WIM and addressed and selected by the WinF according to its WIM program. In the LIMEM instruction 620, bit-fields are defined as follows. W=1 622 indicates to the WinF that this instruction is a 64-bit instruction, 5-bit opcode 624 specifies the operation to synchronously load three IMemories from the data M0, optional itag field 626 associated with the selected AVLI, a set of four reserved bits 627 which can be used as opcode extension fields for example useful in specifying address generation operations, the four fields $B_{i0}$, $B_{i1}$, $B_{i2}$, and $B_{d0}$ 628 are used to specify the base address registers that are to be added with their associated offset field 630, 632, 634, and 636, respectively, to generate the three IMemory addresses and the data M0 address as follows:

IM0 instruction memory effective address=OffsetIM0+$B_{i0}$

IM1 instruction memory effective address=OffsetIM1+$B_{i1}$

IM2 instruction memory effective address=OffsetIM2+$B_{i2}$, and

M0 instruction memory effective address=OffsetDM0+$B_{d0}$.

The data memory paths in each PE use multiple 4-port memories with two read ports and two write ports. Concurrency among the three execution stages is obtained through use of the AVLIs. This is a unique organization in that instead of expanding the number of ports at a single execution level, the execution level is split into multiple cascaded levels and the ports distributed among the multiple levels. In the present exemplary three cascaded execution level Wings processor, having three concurrent sets of read ports allows a total of 6-read ports and 6-write ports to be active in steady state. It is noted that having more storage ports and parallel execution units in each level is not precluded and the expansion horizontally, in other words, at an execution level, and vertically, with more cascaded stages, can be tailored to an application. In addition, the results of execution are interconnected within a PE and between PEs as required by the processor specification. For example, with two PEs and the appropriate instruction coding, the execution units level 1 and 2 can write results to any one of the two M0 memories or any one of the two M1 memories via use of two sets of four to one multiplexers 1320 and 1325 as illustrated in FIG. 13. With this organization, operations can be chained between levels and within a level between PEs.

Figure 14A:
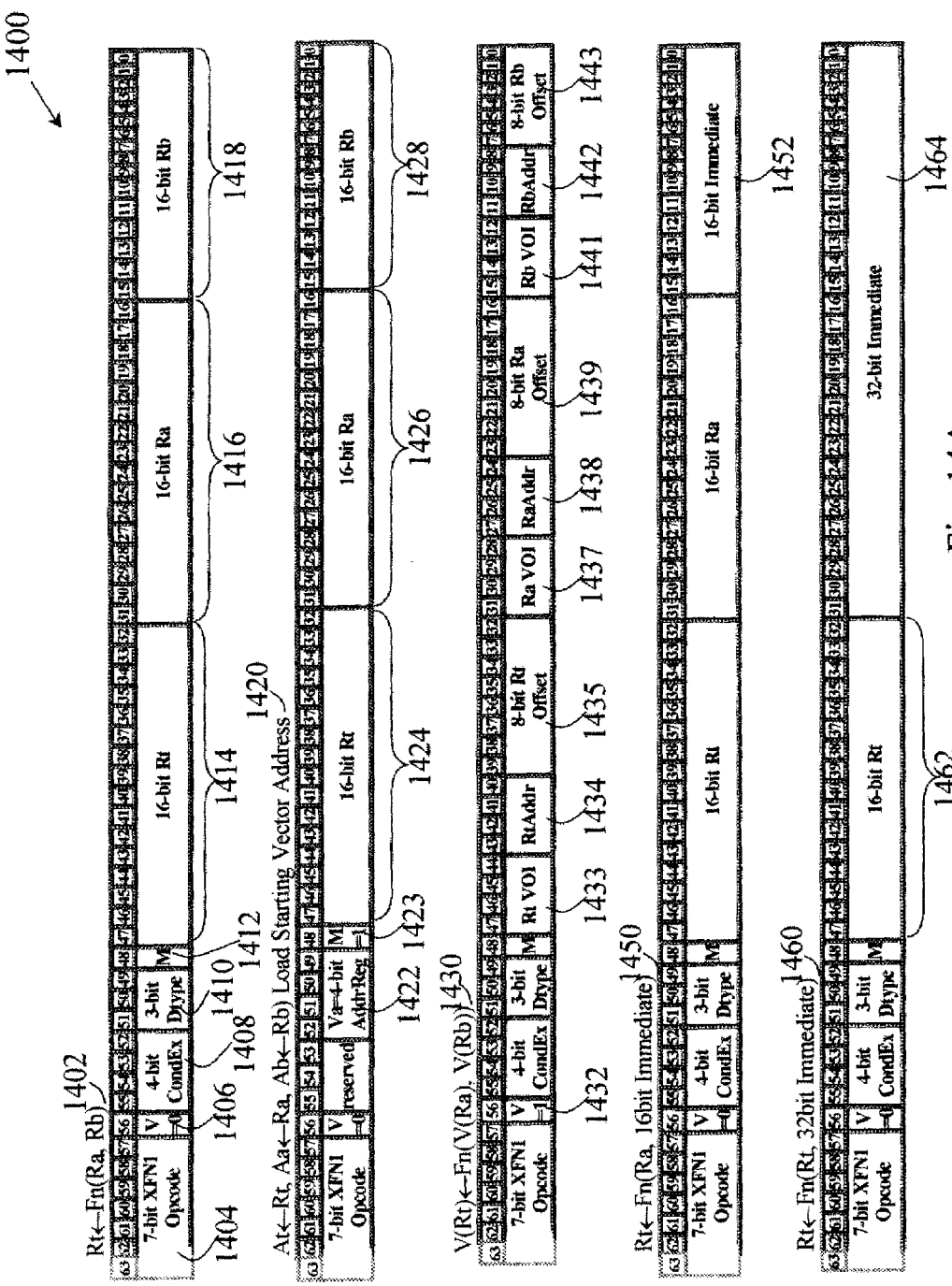
FIG. 14A illustrates a set of exemplary 64-bit PE instructions.

Operands are accessed from the appropriate data memory at each processing stage either by a direct addressing or an indirect addressing mechanism. FIG. 14A illustrates five 64-bit instruction formats 1400 for the exemplary Wings processor for IM0 1116/X0 1120/M0 1122 of FIG. 11. The instruction 1402 where Rt←Fn(Ra, Rb) comprises eight primary fields. A 7-bit opcode 1404 allows the specification of up to 128 opcodes, a vector bit V 1406 is set to 0 inactive for this instruction type, a 4-bit conditional execution parameter field 1408 is used to specify up to 16 different condition execution states, a 3-bit data type field 1410 allows up to 8 different data types to be specified, an execution result Rt target memory selector bit M 1412 specifies M0 when M=0 and M1 when M=1, a 16-bit Rt 1414, a 16-bit Ra 1416, and a 16-bit Rb 1418 provide for direct addressing of the data memory M0 1122 of FIG. 11.

It is noted that a conditional execution architecture is of value to improving performance. Consequently, the multiple levels of execution units are each specified to maintain their own set of arithmetic conditions. A logical function of these conditions at each level and across levels can be specified by the architecture. The illustrated arithmetic/logic instruction formats contain a field 1408 as seen in FIG. 14A specifying the conditions to test for.

To support data-dependent operand addressing and vector-like operand address incrementing (VOI), a separate set of address registers are stored in the M1 address space FIG. 11 and used in the X0 address generation function. For vector operations, the addresses of the starting vector elements must first be loaded into a set of address registers. Using instruction 1420, an address register is specified by Va 1422 which is located in the specified M1 1423 address space. Instruction 1420 causes the vector result Rt starting address 1424 to be loaded into address register At which is specified directly by Va, the 4-bit address register field 1422. The vector operand Ra starting address 1426 is loaded into Aa=Va+1 and the vector operand Rb starting address 1428 is loaded into Ab=Va+2. Once the vector starting addresses have been loaded, a vector operation may begin at any time by executing a vector instruction such as instruction 1430. In this example, the specification of the VOI parameters are contained in the execution unit instruction format and applies primarily to the X0 execution units utilizing the 64-bit instruction format 1430. The instruction 1430 where V(Rt)←Fn(V(Ra), V(Rb)) consists of 14 primary fields. The fields which differ in function from instruction 1402 are the Vector V bit 1432 which is set to 1 active for this instruction and the 16-bit Rt, Ra, and Rb fields of instruction 1402 are split into three separate fields each to specify the vector operand incrementing function. The three fields specify a parameter field for Rt 1433, for Ra 1437, and for Rb 1441, a pointer to the vector incrementing address register for Rt 1434, for Ra 1438, and for Rb 1442, plus an 8-bit offset field to specify the incrementing values for Rt 1435, for Ra 1439, and for Rb 1443. To initiate a vector operation, an instruction of the type 1420 is issued first which sets up the initial registers of the vector block, this initiation is followed by the vector instruction 1430 which the first time it is issued the starting elements of the vectors are used and each time instruction 1430 is issued after the first time a new set of elements is fetched, operated on, and stored back into a vector location as specified and controlled by this instruction using incremented vector addresses.

The instruction 1450 is a variation of the first instruction 1402 using a 16-bit immediate field 1452 in place of the register operand Rb. The instruction 1460 Rt←Fn(Rt, 32 bit immediate) where Rt 1462 is both a source operand and the target and a 32-bit immediate field 1464 is used as a second source operand.

Figure 14B:
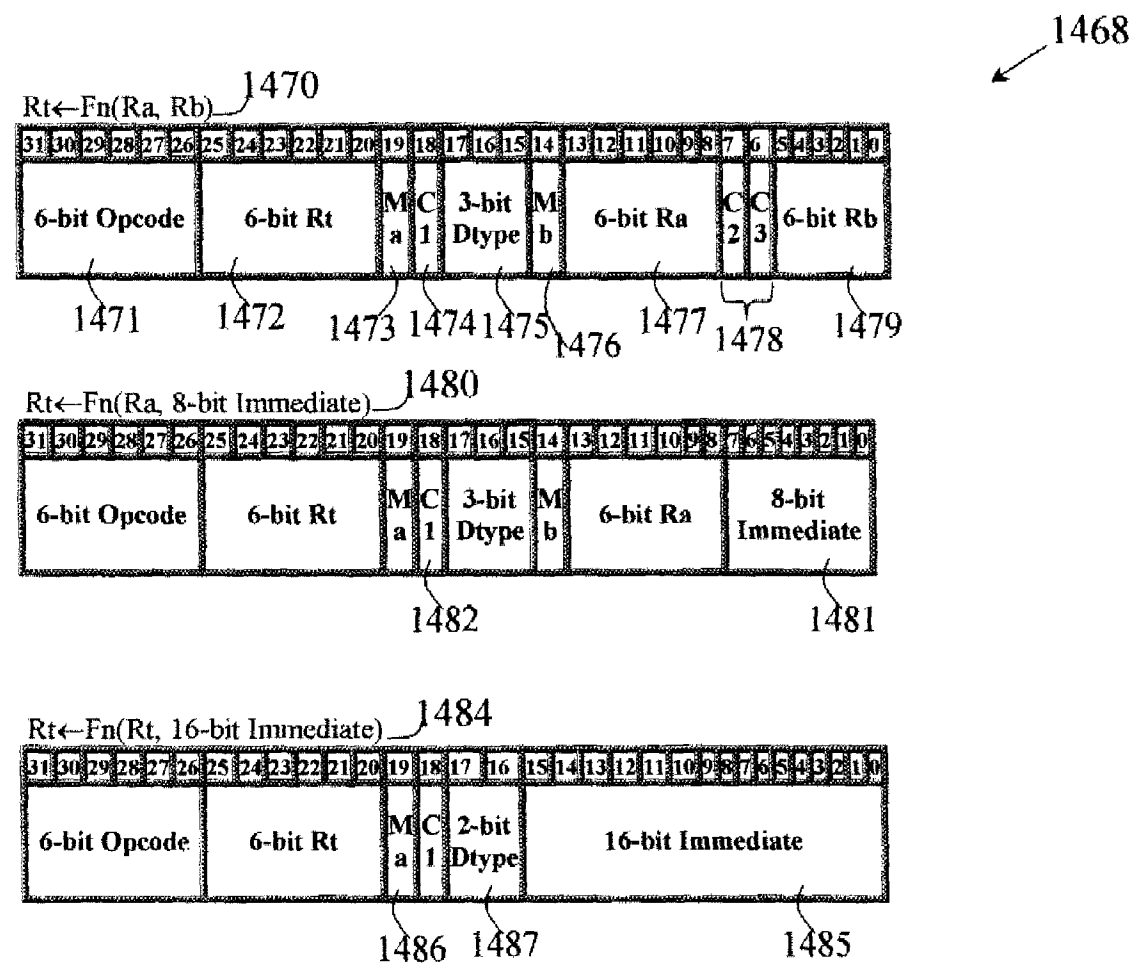

FIG. 14B illustrates three examples of 32-bit instruction types 1468 that are subsets of the 64-bit 1400 instruction types for the X1 and X2 units. Instruction 1470 is a three operand address instruction using a 6-bit opcode 1471, a 6-bit Rt operand address 1472, a Memory selector bit M-a 1473, a conditional execution bit C1 1474, a 3-bit data type field 1475, a memory selector bit M-b 1476, a 6-bit Ra operand address 1477, two conditional execution bits C1 and C2 1478, and a 6-bit Rb operand address 1479. The two memory selector bits M-a 1473 and M-b 1476 are used to select the target memory where the execution results are to be written. It is noted that for first level memory targets indirect addressing may be of value. The three conditional execution bits, C1-3, allow up to eight execution conditions. Instruction 1480 of FIG. 14B is a 2 operand and an 8-bit immediate operand 1481 instruction which has a more restricted conditional execution specification using a single bit C1 1482. Instruction 1484 of FIG. 14B specifies Rt as both a source operand and the target and a 16-bit immediate 1485 is a second source operand. Instruction 1484 has two further restrictions as compared to the previous instruction 1480. First, the Memory selection field is reduced to a single bit M-a 1486 which is architecturally defined to specify the selection of either M1 or M2 as shown in FIG. 11, and, second, a 2-bit data type field 1487 allowing only 4 data types is utilized.

Figure 14C:
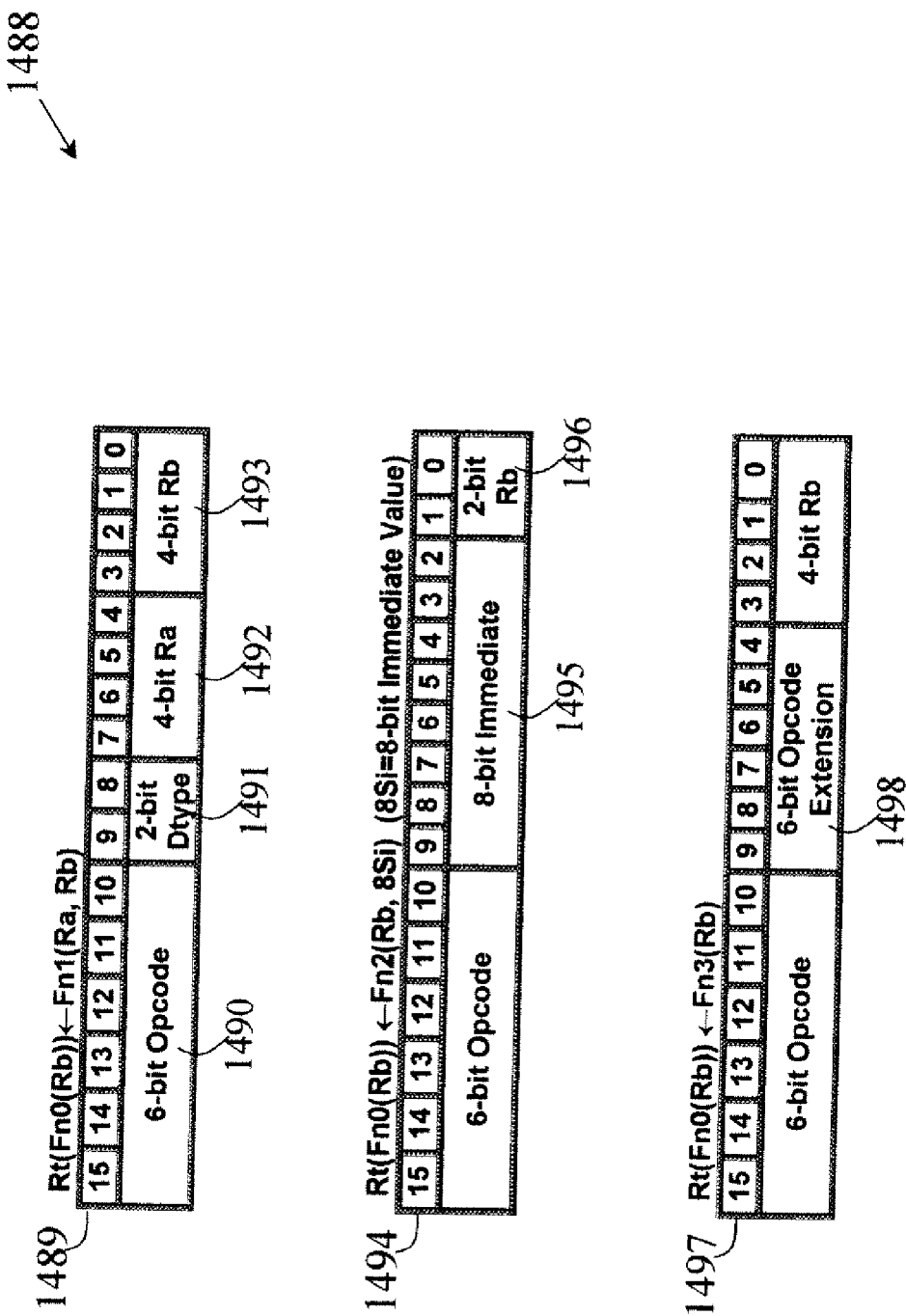
FIG. 14C illustrates a set of exemplary 16-bit PE instructions.

FIG. 14C illustrates examples of formats 1488 of 16-bit instructions for units X1 and X2 that uniquely define the specification of a target register Rt as a function of Rb in order to conserve instruction bit-field formatting space. The memory selection is specified by the instruction opcode to typically be the local execution units memory, in other words, M1 for execution unit X1, and M2 for execution unit X2, unless otherwise defined in the instruction.

A first example of a 16-bit instruction format 1489 uses a 6-bit opcode 1490 (as do the other examples in 1488), a 2-bit Data type (Dtype) field 1491 allowing up to 4 data types to be specified, and two source operand address fields Ra 1492 and Rb 1493. The instruction is defined to produce a result Rt(Fn0 (Rb))←Fn1(Ra, Rb) where the target Rt operand address is specified as a function Fn0 of the Rb value. For example, Fn0 can be an add of a constant, for example, Rt=Rb+j where j is some value guaranteeing the Rt will remain in the addressing range of the target memory element, or a concatenation of bits, for example, Rt=k||Rb where Rt is guaranteed to remain in the addressing range of the target memory element, or more complex functions defined by the architecture. It is noted that the function Fn0 can be one of a number of functions as specified by the opcode or a specified register. In addition, alternate registers could have been used Ra 1492, for example, or some other fixed register value. The function Fn1 is the execution unit function of the source operands as defined by the architecture. For example, a multiply, add, logical, or the like function.

A second example of an instruction type format 1494 differs from format 1489 in the use of an 8-bit immediate field 1495 and a 2-bit Rb 1496 with data type specification defined by the opcode. In this second example, Rt is specified as a function Fn0 of Rb as in the first format 1489, but uses a different function Fn2 where the source operands are the 8-bit immediate value provided by the instruction 1495 and the value stored at the 2-bit Rb address 1496. The function Fn2 is defined by the architecture to be, for example, a multiply, add, logical, or the like function.

A third example of an instruction type format 1497 differs from format 1489 in the use of an opcode extension field 1498 and a single register operand Rb. A new function Fn3(Rb) is specified which may use instruction specific bits in the opcode extension field for such functions as shift, rotates, bit operations including permutations, shuffles, or the like, and other architecture defined functions. Of course, other 8-bit formats or function types are not precluded by these exemplary illustrations of instruction formats.

To demonstrate how the hierarchical system of specifying the packed data organization tied with the number of PEs and the AVLI capabilities of the processor can be expanded to support larger arrays of PEs, a two PE system using 128-bit data path PEs such as shown in FIG. 13 is used in two configurations dependent upon the make up of the AVLI instruction that is selected by the WinF subsystem address generation function. A first configuration is shown in the FIG. 15A system 1500 wherein WIM 1502 ad WinF 1504 comprise a WinF subsystem generating three addresses for IM0, IM1, and IM2 1506. These addresses each individually select instructions from their respective memory with an example of a selection shown in IM0n0 as a 64-bit instruction 1508, a 32-bit instruction in IM0n1 1510 and a 32-bit instruction in IM0n2 1512. These instructions drive the PEs 1514 and 1516 jointly in a concatenated operation with the 64-bit instruction being sent via path 1518 to M0, X0 1520 of PE0000 1514 and to M0, X0 1522 of PE0001 1516. The 32-bit instruction from IM0n1 is sent via path 1524 to M1, X1 1526 of PE0000 1514 and to M1, X1 1528 of PE0001 1516. The 32-bit instruction from IM0n2 is sent via path 1530 to M2, X2 1532 of PE0000 1514 and to M2, X2 1534 of PE0001 1516. The result of this dual driving of both PEs is that both PEs act in unison as a single PE 1536 with effectively twice the data path width of each single PE.

Figure 15A:
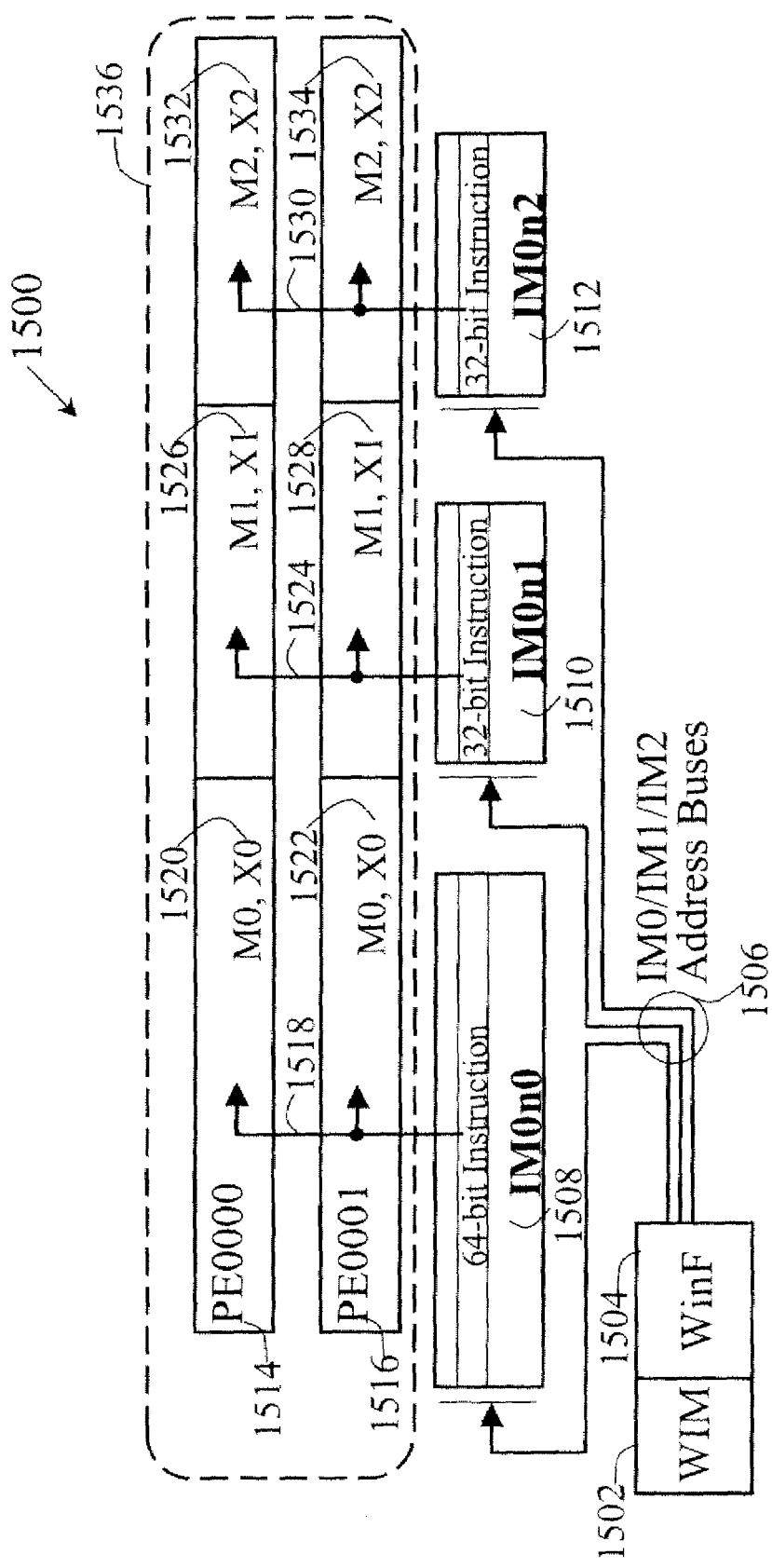
FIG. 15A illustrates the hierarchical operation of two PEs in unison as a single PE with twice the data path width as controlled by the instruction types in operation.
Figure 15B:
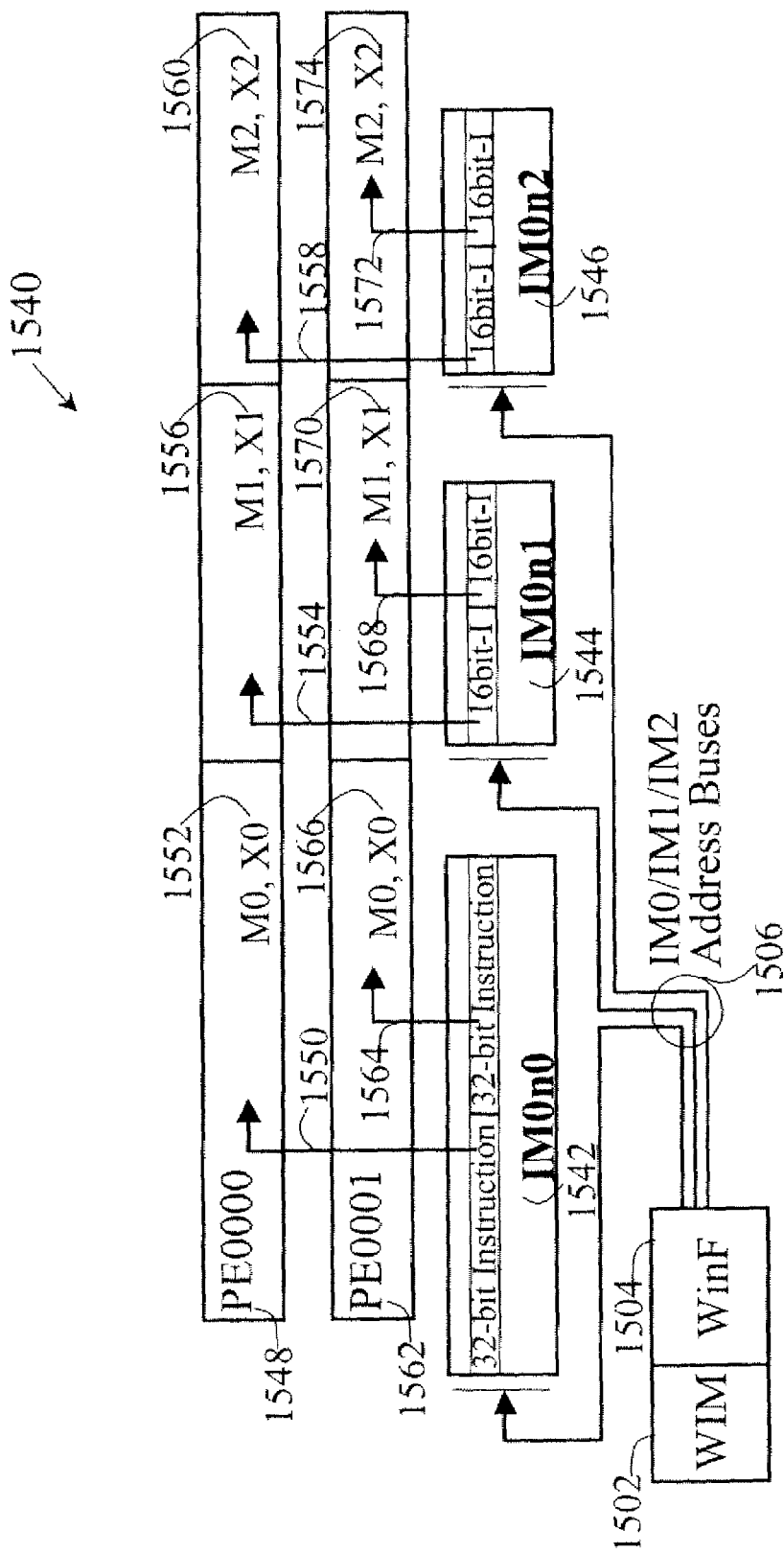
FIG. 15B illustrates the hierarchical operation of two PEs, each individually controlled by the instruction types in operation.

This same system is shown in a second configuration 1540 in FIG. 15B. Common elements have the same numbers in FIG. 15B. Configuration 1540 uses the same WinF subsystem consisting of WIM 1502 and WinF 1504 generating the same three address buses to IM0/IM1/IM2 1506 to independently select instructions from their respective memories. In IM0n0, now two 32-bit instructions 1542 are selected, in IM0n1 two 16-bit instructions 1544 and in IM0n2 also two 16-bit instructions 1546. The first instruction of each pair of instructions is sent in parallel to PE0000 1548. The first instruction from IM0n0 is sent via path 1550 to M0, X0 1552, the first instruction from IM0n1 is sent via path 1554 to M1, X1 1556 and the first instruction from IM0n2 is sent via path 1558 to M2, X2 1560. Also in parallel, the second instruction from IM0n0 is sent via path 1564 to M0, X0 1566, the second instruction from IM0n1 is sent via path 1568 to M1, X1 1570 and the second instruction from IM0n2 is sent via path 1572 to M2, X2 1574. The result of this parallel and independent driving of both PEs is that they both act as separate PEs where each instruction can be different than its counterpart section of the dual PE system.

Figure 15C:
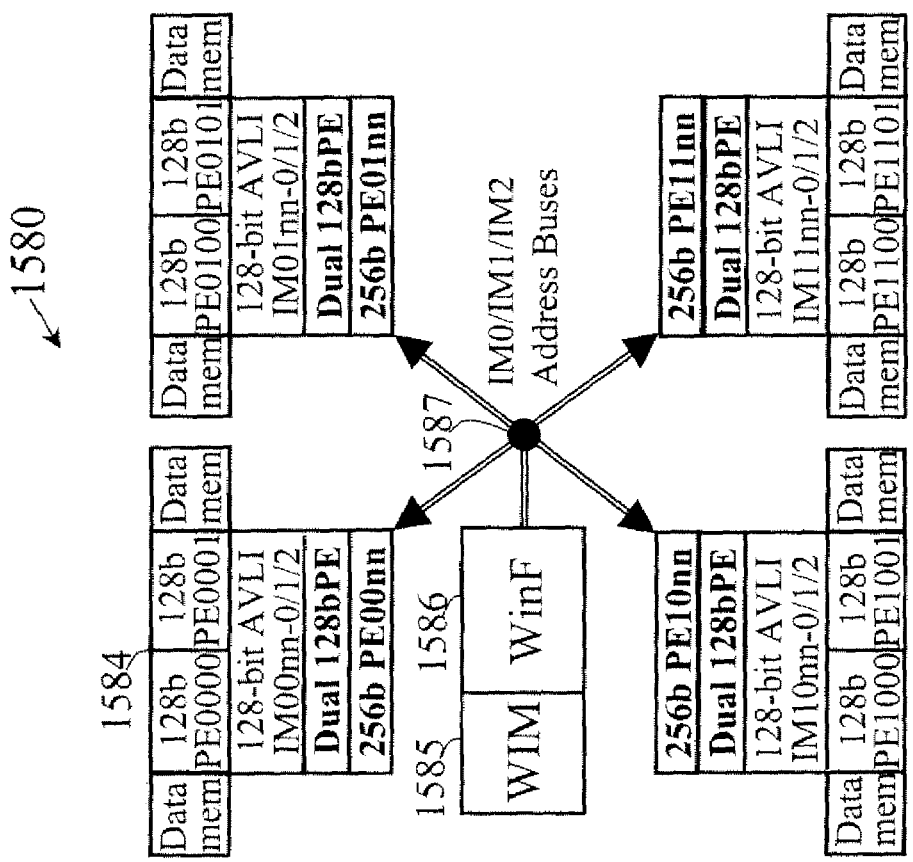
FIG. 15C illustrates the scalable nature of the Wings machine or organization with one machine organization configurable as a 2×2 256-bit processor or a 2×4 128-bit processor.
Figure 15D:
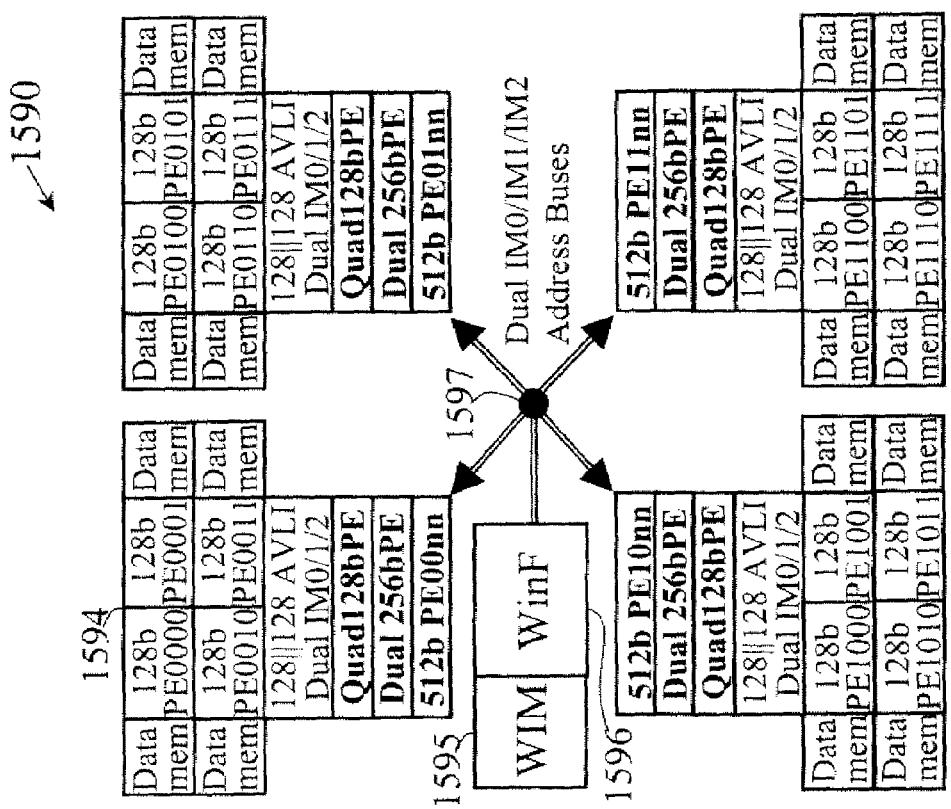
FIG. 15D illustrates a second machine organization configurable as a 2×2 512-bit processor, a 2×4 256-bit processor, or a 4×4 128-bit processor.

This approach as shown in FIGS. 15A and 15B is extended for larger arrays of PEs as shown in the two systems 1580 and 1590 of FIGS. 15C and 15D. System 1580 comprises four clusters of two 128-bit PEs each, such as 1584, which when in SIMD operation acts as four 256-bit PEs, each similar to the concatenated PE 1536 of FIG. 15A, and when independent 128-bit operations are specified the system 1580 acts as eight 128-bit PEs, each similar to the independent PEs 1548 and 1562 of FIG. 15B, in each cluster of two PEs. The WIM 1585 holds the address generation program for the multiple sets of instruction memories and the WinF 1586 generates three separate address buses 1587, an IM0 address, an IM1 address, and an IM2 address, which are distributed to each cluster. This arrangement is similar to the WIM 1502. WinF 1504 and three address buses 1506 of FIGS. 15A and 15B. Specifically, each cluster of two PEs has its own IM memory subsystem and no instructions are sent to the PEs from the WinF subsystem. Only addresses, over address lines 1587, are sent to the PEs to access the distributed IMemories. In this fashion the clustered array acts as either 4 PEs each with 256-bit data paths or as 8 PEs each with 128-bit data paths.

This concept is generally extendable to larger arrays. For example, the system 1590 of FIG. 15D comprises four clusters of four 128-bit PEs each, such as PE 1594 with each four PE cluster containing two AVLI IMemory subsystems. This clustered array 1590 when in a first SIMD operation cycle acts as four 512-bit PEs, when in a second SIMD operation cycle acts as eight 256-bit PEs, and when independent 128-bit operations are specified the system 1590 acts as sixteen 128-bit PEs. The WIM 1595 holds the address generation program for the multiple sets of instruction memories and the WinF 1596 generates six separate address buses 1597, dual IM0 addresses, dual IM1 addresses, and dual IM2 addresses, which are distributed to each cluster.

While the present invention is disclosed in a presently preferred context, it will be recognized that the teachings of the present invention may be variously embodied consistent with the disclosure and claims. By way of example, the present invention is disclosed in connection with a memory-to-memory architecture and it is equally applicable to register based RISC type processors. It will be recognized that the present teachings may be adapted to other present and future architectures to which they may be beneficial, or the Wings architecture as it evolves in the future.

I claim:

1. A computer implemented method comprising:
separating function instructions intermixed with control structure instructions from an original program into a list of the function instructions separate from the control structure instructions;
removing duplicate function instructions from the list of function instructions to create a reduced list of function instructions;
assigning to each function instruction in the reduced list of function instructions an address in at least one function memory where the corresponding function instruction is to be stored;
generating a selection program made up of selection instructions in a sequencing order to preserve the function of the original program, the selection instructions comprising a function selection instruction formatted to identify an assigned address in the at least one function memory for programmably fetching the corresponding function instruction for execution; and
utilizing the selection program and the reduced list of function instructions in place of the original program.

2. The computer implemented method of claim 1 wherein a function instruction is defined to produce a result Rt(Fn0(Rb))←Fn1(Rb) wherein the target Rt operand address is specified as a function Fn0 of the Rb value, Rb is specified in the function instruction, and the functions Fn0 and Fn1 are specified by an opcode of the function instruction.

3. The computer implemented method of claim 1 wherein the function instructions are non-control structure instructions comprised of a selected set of adds, subtracts, multiplies, divides, logical functions, shifts, rotates, permutations, bit operations, and other arithmetic and logic type functions.

4. The computer implemented method of claim 1 wherein the control structure instructions are comprised of a selected set of for-do, if-then-else, case, while-do, do-until, do-while, branch, call, return, and auto-loop instructions.

5. The computer implemented method of claim 1 wherein the sequencing order is controlled by information contained in the selection instructions, wherein the selection instructions are of a different type and format than instructions used in the original program.

6. The computer implemented method of claim 1 further comprising:
determining the sequencing order based on the control structure instructions and the order of executing the function instructions.

7. The computer implemented method of claim 1 further comprising:
storing the function instructions from the reduced list of function instructions at the corresponding assigned addresses in the at least one function memory; and
storing the selection program in a memory that is separate from the function memory.

8. The computer implemented method of claim 7 further comprising:
fetching the selection instructions from the memory in the sequencing order;
executing the fetched selection instructions, whereby the execution of a fetched selection instruction generates at least one assigned address;
fetching function instructions from the at least one function memory at the assigned addresses generated by executing the fetched selection instructions; and
executing the fetched function instructions, whereby the function of the original program is preserved.

9. A computer implemented method comprising:
separating function instructions intermixed with control structure instructions from an original program into a list of the function instructions separate from the control structure instructions;
selecting function instructions, which may be executed together in parallel, from the list of function instructions;
assembling the selected function instructions into an assembled variable length instruction (AVLI) format, whereby a plurality of AVLIs may be created;
assigning to each selected function instruction in the AVLI format an AVLI reference address in one of a plurality of function memories where each selected function instruction is to be stored; and
generating a selection program made up of selection instructions in a sequencing order to preserve the function of the original program, the selection instructions comprising an AVLI selection instruction formatted to identify AVLI reference addresses for programmably fetching the selected function instructions associated with an AVLI from a number of the plurality of function memories for execution together in parallel.

10. The computer implemented method of claim 9 further comprising:

removing duplicate function instructions from the list of function instructions to create a reduced list of function instructions;

assigning to each function instruction in the reduced list of function instructions an address in at least one of the plurality of function memories where the corresponding function instruction is to be stored, wherein the selection instructions further comprise a function selection instruction formatted to identify an assigned address in the at least one of the plurality of function memories for programmably fetching the corresponding function instruction for execution; and utilizing the selection program, the plurality of AVLIs, and the reduced list of function instructions in place of the original program.

11. The computer implemented method of claim 9 wherein the function instructions are non-control instructions comprised of a selected set of adds, subtracts, multiplies, divides, logical functions, shifts, rotates, permutations, bit operations, and other arithmetic and logic type functions and the control structure instructions are comprised of a selected set of for-do, if-then-else, case, while-do, do-until, do-while, branch, call, return, and auto-loop instructions.

12. The computer implemented method of claim 9 wherein at least one address of the AVLI reference addresses is an address of a location in a single function memory having a plurality of diverse function instructions to be fetched in parallel.

13. The computer implemented method of claim 9 further comprising:

selecting function instructions from the list of function instructions to assemble a block of function instructions, the block of function instructions to be stored in a function memory at assigned addresses; and selecting an address of a function instruction as an entry address into the block of function instructions, wherein the selection instructions further comprise a block selection instruction formatted to identify the entry address for programmably fetching function instructions from the block of function instructions for execution.

14. The computer implemented method of claim 13 further comprising:

assigning a count value as part of the block selection instruction to indicate the number of instructions to be executed from the block of function instructions.

15. The computer implemented method of claim 9 further comprising:

selecting singleton function instructions, which are to be executed singly, from the list of function instructions;

assigning to each singleton function instruction in address in one of the plurality of function memories where each singleton function instruction is to be stored, wherein the selection instructions further comprise a singleton selection instruction formatted to identify the assigned address of the corresponding singleton function instruction for programmably fetching the singleton function instruction for execution; and utilizing the selection program, the plurality of AVLIs, and the singleton function instructions in place of the original program.

16. The computer implemented method of claim 9 further comprising:

storing at the corresponding assigned addresses the AVLIs in the plurality of function memories; and storing the selection program in a memory that is separate from the plurality of function memories.

17. The computer implemented method of claim 16 further comprising:

fetching, the selection instructions from the memory in the sequencing order;

executing the fetched selection instructions, whereby the execution of a fetched selection instruction generates a plurality of assigned addresses associated with a selected AVLI;

fetching the selected AVLI from the number of the plurality of function memories at the assigned AVLI reference addresses generated by executing the fetched selection instruction; and executing function instructions associated with the fetched selected AVLI together in parallel beginning in the same execution pipeline stage.

18. The computer implemented method of claim 16 further comprising:

fetching the selection instructions from the memory in the sequencing order;

executing the fetched selection instructions, whereby the execution of a fetched selection instruction generates a plurality of assigned addresses associated with a selected AVLI;

fetching the selected AVLI from the number of the plurality of function memories at the assigned AVLI reference addresses generated by executing the fetched selection instruction; and executing different sub-sets of function instructions associated with the fetched selected AVLI in different execution pipeline stages.

19. A computer implemented method comprising:

separating function instructions intermixed with control structure instructions from an original program into a list of the function instructions separate from the control structure instructions;

selecting from the list of function instructions singleton function instructions that are to be executed sequentially and groups of function instructions that are to be executed as assembled variable length instructions (AVLIs), each AVLI having a number of function instructions that can be executed in parallel, wherein the number of function instructions in each AVLI can vary between AVLIs;

assigning based on the singleton function instructions and the AVLIs an address to each of the function instructions in one of a plurality of function memories where the corresponding function instruction is to be stored;

generating a selection program made up of selection instructions in a sequencing order to preserve the function of the original program, the selection instructions comprising a singleton selection instruction and an AVLI selection instruction both formatted to identify one or more of the assigned addresses for programmably fetching one or more of the addressed function instructions from the one or more of the plurality of function memories; and utilizing the selection program and the list of function instructions in place of the original program.

20. The computer implemented method of claim 19 further comprising:

removing duplicate function instructions from the list of function instructions to create a reduced list of function instructions; and utilizing the selection program and the reduced list of function instructions in place of the original program.

* * * * *

UNITED STATES PATENT AND TRADEMARK OFFICE
CERTIFICATE OF CORRECTION

PATENT NO.         : 7,509,483 B2
APPLICATION NO. : 11/677640
DATED              : March 24, 2009
INVENTOR(S)     : Gerald George Pechanek It is certified that error appears in the above-identified patent and that said Letters Patent is hereby corrected as shown below:

In column 25, line 50, in Claim 15, before "address" delete "in" and insert -- an --, therefor.

In column 26, line 3, in Claim 17, delete "fetching," and insert -- fetching --, therefor.

Signed and Sealed this

Twenty-first Day of July, 2009

JOHN DOLL
*Acting Director of the United States Patent and Trademark Office*